US010945251B2

(12) United States Patent
Nogami et al.

(10) Patent No.: US 10,945,251 B2
(45) Date of Patent: Mar. 9, 2021

(54) USER EQUIPMENTS, BASE STATIONS AND METHODS

(71) Applicant: Sharp Kabushiki Kaisha, Sakai (JP)

(72) Inventors: Toshizo Nogami, Chiba (JP); Zhanping Yin, Vancouver, WA (US); Jia Sheng, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 16/190,626

(22) Filed: Nov. 14, 2018

(65) Prior Publication Data

US 2019/0150123 A1 May 16, 2019

Related U.S. Application Data

(63) Continuation of application No. PCT/US2018/060776, filed on Nov. 13, 2018.
(Continued)

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0053* (2013.01); *H04W 72/14* (2013.01);
(Continued)

(58) Field of Classification Search
CPC combination set(s) only.
See application file for complete search history.

(56) References Cited

U.S. PATENT DOCUMENTS

2010/0279628 A1* 11/2010 Love ............... H04L 5/0091
455/70
2010/0331030 A1* 12/2010 Nory ............... H04L 5/0053
455/509

(Continued)

FOREIGN PATENT DOCUMENTS

WO    2017160100 A2    9/2017

OTHER PUBLICATIONS

3GPP TS 36.211 V14.0.0, Evolved Universal Terrestrial Radio Access (E-UTRA); Physical channels and modulation (Release 14) Sep. 2016.

(Continued)

*Primary Examiner* — Syed Ali
(74) *Attorney, Agent, or Firm* — Austin Rapp

(57) ABSTRACT

A user equipment (UE) is described. The UE includes a higher layer processor configured to acquire a first radio resource control (RRC) configuration including first information for indicating a control resource set (CORESET) duration, and to acquire second RRC configuration including second information for indicating physical downlink control channel (PDCCH) monitoring symbols. The UE also includes receiving circuitry configured to monitor a PDCCH, based on the first information and the second information. The CORESET duration is set to a value larger than 1. The second information is bitmap information. Each bit of the bitmap information corresponds to a respective OFDM symbol in a slot. The bit of which value is set to 1 indicates a start of a PDCCH monitoring occasion. The bitmap information is set such that any two adjacent PDCCH monitoring occasions do not overlap with each other.

4 Claims, 26 Drawing Sheets

Related U.S. Application Data

(60) Provisional application No. 62/586,378, filed on Nov. 15, 2017.

(51) Int. Cl.
*H04W 72/14* (2009.01)
*H04W 72/12* (2009.01)

(52) U.S. Cl.
CPC .............. *H04L 5/001* (2013.01); *H04L 5/005* (2013.01); *H04L 5/0048* (2013.01); *H04L 5/0051* (2013.01); *H04L 5/0055* (2013.01); *H04W 72/1231* (2013.01)

(56) References Cited

U.S. PATENT DOCUMENTS

| | | | |
|---|---|---|---|
| 2011/0205978 A1* | 8/2011 | Nory | H04L 5/0098 370/329 |
| 2013/0250882 A1* | 9/2013 | Dinan | H04L 5/0032 370/329 |
| 2013/0322382 A1 | 12/2013 | Dinan | |
| 2017/0374569 A1* | 12/2017 | Lee | H04W 48/12 |
| 2018/0206266 A1* | 7/2018 | Byun | H04L 5/0053 |
| 2018/0234955 A1* | 8/2018 | Lin | H04W 72/042 |
| 2018/0279289 A1* | 9/2018 | Islam | H04L 5/0094 |
| 2018/0324830 A1* | 11/2018 | Islam | H04W 72/1236 |
| 2018/0368115 A1* | 12/2018 | Li | H04L 5/0053 |
| 2018/0368122 A1* | 12/2018 | Kuchibhotla | H04L 5/0007 |
| 2019/0020506 A1* | 1/2019 | Cheng | H04L 5/0053 |
| 2019/0052432 A1* | 2/2019 | Islam | H04W 76/27 |
| 2019/0053318 A1* | 2/2019 | Nogami | H04W 72/042 |
| 2019/0082448 A1* | 3/2019 | Nogami | H04W 72/1263 |
| 2019/0306737 A1* | 10/2019 | Kwak | H04L 5/0053 |
| 2020/0287678 A1* | 9/2020 | Li | H04L 5/0048 |

OTHER PUBLICATIONS

3GPP TS 36.213 V14.0.0, Evolved Universal Terrestrial Radio Access (E-UTRA); Physical layer procedures (Release 14) Sep. 2016.

Catt, "[89-20] email discussion: Group-common PDCCH for NR", 3GPP TSG RAN WG1 NR Ad-Hoc #2, Qingdao, P. R. China, R1-170xxx, Jun. 30, 2017.

NTT DOCOMO, Inc., "Offline discussions on some topics for AI6.1.3.1", 3GPP TSG RAN WG1 Meeting #90, Prague, Czechia, R1-17xxxxx, Aug. 25, 2017.

International Search Report and Written Opinion issued for PCT Application No. PCT/US2018/060776 dated Jan. 18, 2019.

\* cited by examiner

US 10,945,251 B2

USER EQUIPMENTS, BASE STATIONS AND METHODS

RELATED APPLICATIONS

This application is related to and claims priority from U.S. Provisional Patent Application No. 62/586,378, entitled "USER EQUIPMENTS, BASE STATIONS AND METHODS," filed on Nov. 15, 2017, which is hereby incorporated by reference herein, in its entirety.

TECHNICAL FIELD

The present disclosure relates generally to communication systems. More specifically, the present disclosure relates to new signaling, procedures, user equipment (UE) and base stations for user equipments, base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
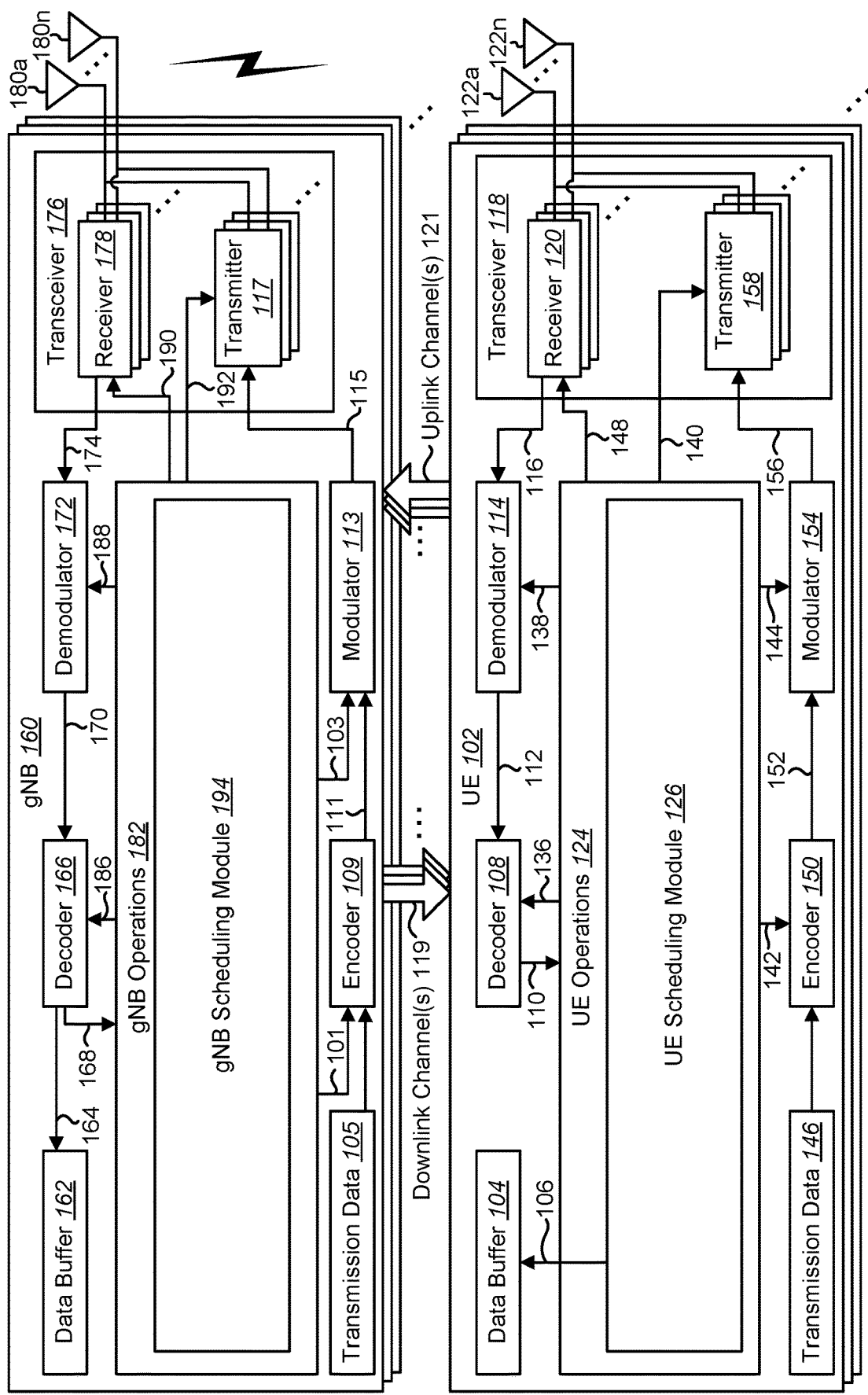
FIG. 1 is a block diagram illustrating one implementation of one or more gNBs and one or more user equipments (UEs) in which systems and methods for uplink transmission may be implemented.

A user equipment (UE) is described. The UE includes a higher layer processor configured to acquire a first radio resource control (RRC) configuration including first information for indicating a control resource set (CORESET) duration, and to acquire second RRC configuration including second information for indicating physical downlink control channel (PDCCH) monitoring symbols. The UE also includes receiving circuitry configured to monitor a PDCCH, based on the first information and the second information. The CORESET duration may be set to a value larger than 1. The second information may be bitmap information. Each bit of the bitmap information may correspond to a respective OFDM symbol in a slot. The bit of which value is set to 1 may indicate a start of a PDCCH monitoring occasion. The bitmap information may be set such that any two adjacent PDCCH monitoring occasions do not overlap with each other.

A base station is described. The base station includes a higher layer processor configured to send a first radio resource control (RRC) configuration including first information for indicating a control resource set (CORESET) duration, and to send second RRC configuration including second information for indicating physical downlink control channel (PDCCH) monitoring symbols. The base station also includes transmitting circuitry configured to transmit a PDCCH, based on the first information and the second information. The CORESET duration may be set to a value larger than 1. The second information may be bitmap information. Each bit of the bitmap information may correspond to a respective OFDM symbol in a slot. The bit of which value is set to 1 may indicate a start of a PDCCH monitoring occasion. The bitmap information may be set such that any two adjacent PDCCH monitoring occasions do not overlap with each other.

A method for a user equipment (UE) is described. The method for a UE comprises acquiring a first radio resource control (RRC) configuration including first information for indicating a control resource set (CORESET) duration. The method for a UE also comprises acquiring second RRC configuration including second information for indicating physical downlink control channel (PDCCH) monitoring symbols. The method for a UE also comprises monitoring a PDCCH, based on the first information and the second information. The CORESET duration may be set to a value larger than 1. The second information may be bitmap information. Each bit of the bitmap information may correspond to a respective OFDM symbol in a slot. The bit of which value is set to 1 may indicate a start of a PDCCH monitoring occasion. The bitmap information may be set such that any two adjacent PDCCH monitoring occasions do not overlap with each other.

A method for a base station is described. The method for a base station comprises sending a first radio resource control (RRC) configuration including first information for indicating a control resource set (CORESET) duration. The method for a base station also comprises sending a second RRC configuration including second information for indicating physical downlink control channel (PDCCH) monitoring symbols. The method for a base station also comprises transmitting a PDCCH, based on the first information and the second information. The CORESET duration may be set to a value larger than 1. The second information may be bitmap information. Each bit of the bitmap information may correspond to a respective OFDM symbol in a slot. The bit of which value is set to 1 may indicate a start of a PDCCH monitoring occasion. The bitmap information may be set such that any two adjacent PDCCH monitoring occasions do not overlap with each other.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, vehicles, Internet of Things (IoT) devices, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB), a next Generation Node B (gNB) or some other similar terminology. As the scope of the disclosure should not be limited to 3GPP standards, the terms "base station," "Node B," "eNB," "HeNB," and "gNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra-Reliable and Low Latency Communication) transmission, and eMTC (massive Machine Type Communication) transmission. Also, in NR, single-beam and/or multi-beam operations is considered for downlink and/or uplink transmissions.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for downlink and uplink transmissions may be implemented. The one or more UEs 102 communicate with one or more gNBs 160 using one or more physical antennas 122*a-n*. For example, a UE 102 transmits electromagnetic signals to the gNB 160 and receives electromagnetic signals from the gNB 160 using the one or more physical antennas 122*a-n*. The gNB 160 communicates with the UE 102 using one or more physical antennas 180*a-n*.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (Physical Uplink Shared Channel)), and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 physical shared channel (e.g., PDSCH (Physical Downlink Shared Channel), and/or a physical control channel (PDCCH (Physical Downlink Control Channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE scheduling module 126.

The UE scheduling module 126 may perform uplink transmissions. The uplink transmissions include data transmission transmission) and/or uplink reference signal transmission.

In a radio communication system, physical channels (uplink physical channels and/or downlink physical channels) may be defined. The physical channels (uplink physical channels and/or downlink physical channels) may be used for transmitting information that is delivered from a higher layer. For example, PCCH (Physical Control Channel) may be defined. PCCH is used to transmit control information.

In uplink, PCCH (e.g., Physical Uplink Control Channel (PUCCH)) is used for transmitting Uplink Control Information (UCI). The UCI may include Hybrid Automatic Repeat Request (HARQ-ACK), Channel State information (CSI), and/or Scheduling Request (SR). The HARQ-ACK is used for indicating a positive acknowledgement (ACK) or a negative acknowledgment (NACK) for downlink data (i.e., Transport block(s), Medium Access Control Protocol Data Unit (MAC PDU), and/or Downlink Shared Channel (DL-SCH)). The CSI is used for indicating state of downlink channel. Also, the SR is used for requesting resources of uplink data (i.e., Transport block(s), MAC PDU, and/or Uplink Shared Channel (UL-SCH)).

In downlink, PCCH (e.g., Physical Downlink Control Channel (PDCCH)) may be used for transmitting Downlink Control Information (DCI). Here, more than one DCI formats may be defined for DCI transmission on the PDCCH. Namely, fields may be defined in the DCI format, and the fields are mapped to the information bits (i.e., DCI bits). For example, a DCI format 1A that is used for scheduling of one physical shared channel (PSCH) (e.g., PDSCH, transmission of one downlink transport block) in a cell is defined as the DCI format for the downlink. The DCI format(s) for PDSCH scheduling may include multiple information field, for example, carrier indicator field, frequency domain PDSCH resource allocation field, time domain PDSCH resource allocation field, bundling size field, MCS field, new data indicator field, redundancy version field, HARQ process number field, code block group flush indicator (CBGFI) field, code block group transmission indicator (CBGTI) field, PUCCH power control field, PUCCH resource indicator field, antenna port field, number of layer field, quasi-co-location (QCL) indication field, SRS triggering request field, and RNTI field. More than one pieces of the above information may be jointly coded, and in this instance jointly coded information may be indicated in a single information field.

Also, for example, a DCI format 0 that is used for scheduling of one PSCH (e.g., PUSCH, transmission of one uplink transport block) in a cell is defined as the DCI format for the uplink. For example, information associated with PSCH (a PDSCH resource, PUSCH resource) allocation, information associated with modulation and coding scheme (MCS) for PSCH, and DCI such as Transmission Power Control (TPC) command for PUSCH and/or PUCCH are included the DCI format. Also, the DCI format may include information associated with a beam index and/or an antenna port. The beam index may indicate a beam used for downlink transmissions and uplink transmissions. The antenna port may include DL antenna port and/or UL antenna port.

The DCI format(s) for PUSCH scheduling may include multiple information field, for example, carrier indicator field, frequency domain PUSCH resource allocation field, time domain PUSCH resource allocation field, MCS field, new data indicator field, redundancy version field, HARQ process number field, code block group flush indicator (CBGFI) field, code block group transmission indicator (CBGTI) field, PUSCH power control field, SRS resource indicator (SRI) field, wideband and/or subband transmit precoding matrix indicator (TPMI) field, antenna port field, scrambling identity field, number of layer field, CSI report triggering request field, CSI measurement request field, SRS triggering request field, and RNTI field. More than one pieces of the above information may be jointly coded, and in this instance jointly coded information may be indicated in a single information field.

Also, for example, PSCH may be defined. For example, in a case that the downlink PSCH resource (e.g., PDSCH resource) is scheduled by using the DCI format, the UE 102 may receive the downlink data, on the scheduled downlink PSCH resource. Also, in a case that the uplink PSCH resource (e.g., PUSCH resource) is scheduled by using the DCI format, the UE 102 transmits the uplink data, on the scheduled uplink PSCH resource. Namely, the downlink PSCH is used to transmit the downlink data. And, the uplink PSCH is used to transmit the uplink data.

Furthermore, the downlink PSCH and the uplink PSCH are used to transmit information of higher layer (e.g., Radio Resource Control (RRC)) layer, and/or MAC layer). For example, the downlink PSCH and the uplink PSCH are used to transmit RRC message (RRC signal) and/or MAC Control Element (MAC CE). Here, the RRC message that is transmitted from the gNB 160 in downlink may be common to multiple UEs 102 within a cell (referred as a common RRC message). Also, the RRC message that is transmitted from the gNB 160 may be dedicated to a certain UE 102 (referred as a dedicated RRC message). The RRC message and/or the MAC CE are also referred to as a higher layer signal.

Furthermore, in the radio communication for uplink, UL RS(s) is used as uplink physical signal(s). The uplink physical signal is not used to transmit information that is provided from the higher layer, but is used by a physical layer. For example, the UL RS(s) may include the demodulation reference signal(s), the UE-specific reference signal(s), the sounding reference signal(s), and/or the beam-specific reference signal(s). The demodulation reference signal(s) may include demodulation reference signal(s) associated with transmission of uplink physical channel (e.g., PUSCH and/or PUCCH).

Also, the UE-specific reference signal(s) may include reference signal(s) associated with transmission of uplink physical channel (e.g., PUSCH and/or PUCCH). For example, the demodulation reference signal(s) and/or the UE-specific reference signal(s) may be a valid reference for demodulation of uplink physical channel only if the uplink physical channel transmission is associated with the corresponding antenna port. The gNB 160 may use the demodulation reference signal(s) and/or the UE-specific reference signal(s) to perform (re)configuration of the uplink physical channels. The sounding reference signal may be used to measure an uplink channel state.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the transmission data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may perform scheduling of uplink transmissions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the transmission data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the gNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
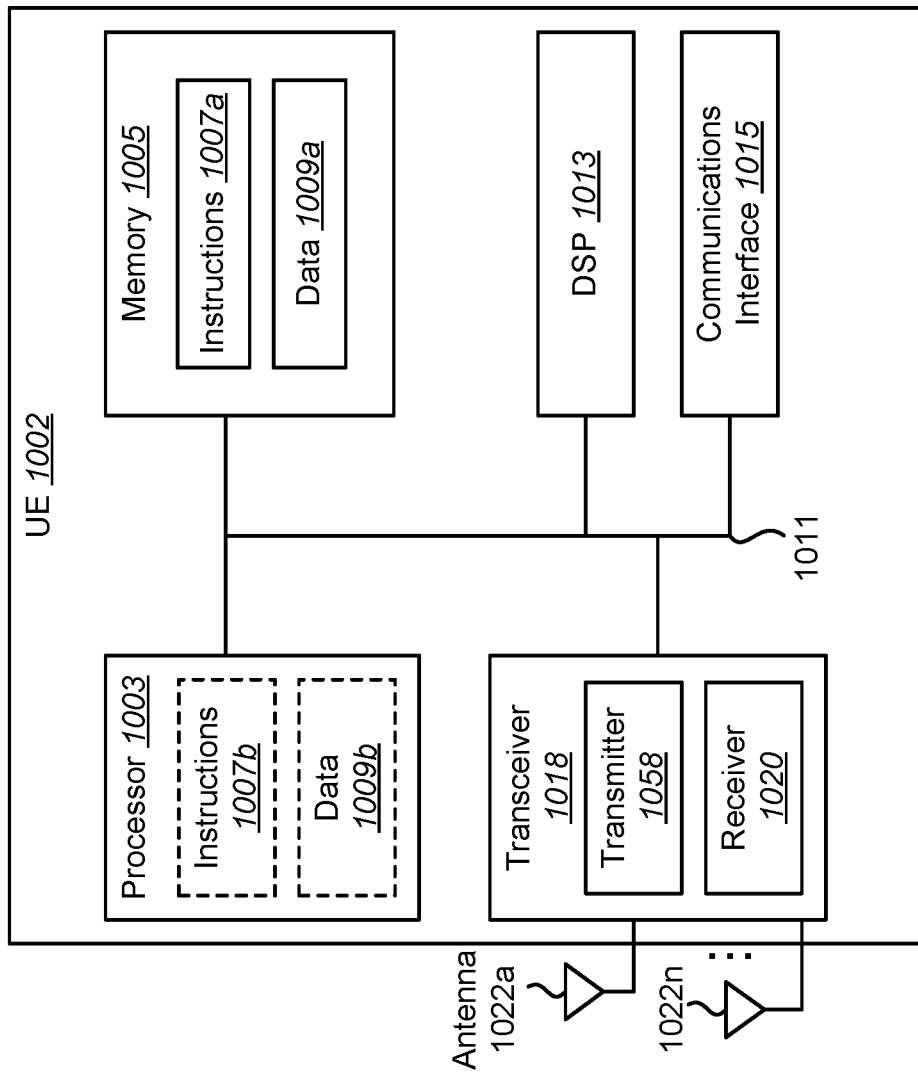
FIG. 2 illustrates various components that may be utilized in a UE.

FIG. 2 illustrates various components that may be utilized in a UE 1002. The UE 1002 described in connection with FIG. 2 may be implemented in accordance with the UE 102 described in connection with FIG. 1. The UE 1002 includes a processor 1003 that controls operation of the UE 1002. The processor 1003 may also be referred to as a central processing unit (CPU). Memory 1005, which may include read-only memory (ROM), random access memory (RAM), a combination of the two or any type of device that may store information, provides instructions 1007a and data 1009a to the processor 1003. A portion of the memory 1005 may also include non-volatile random access memory (NVRAM). Instructions 1007b and data 1009b may also reside in the processor 1003. Instructions 1007b and/or data 1009b loaded into the processor 1003 may also include instructions 1007a and/or data 1009a from memory 1005 that were loaded for execution or processing by the processor 1003. The instructions 1007b may be executed by the processor 1003 to implement the methods described above.

The UE 1002 may also include a housing that contains one or more transmitters 1058 and one or more receivers 1020 to allow transmission and reception of data. The transmitter(s) 1058 and receiver(s) 1020 may be combined into one or more transceivers 1018. One or more antennas 1022a-n are attached to the housing and electrically coupled to the transceiver 1018.

The various components of the UE 1002 are coupled together by a bus system 1011, which may include a power bus, a control signal bus and a status signal bus, in addition to a data bus. However, for the sake of clarity, the various buses are illustrated in FIG. 2 as the bus system 1011. The UE 1002 may also include a digital signal processor (DSP) 1013 for use in processing signals. The UE 1002 may also include a communications interface 1015 that provides user access to the functions of the UE 1002. The UE 1002 illustrated in FIG. 2 is a functional block diagram rather than a listing of specific components.

Figure 3:
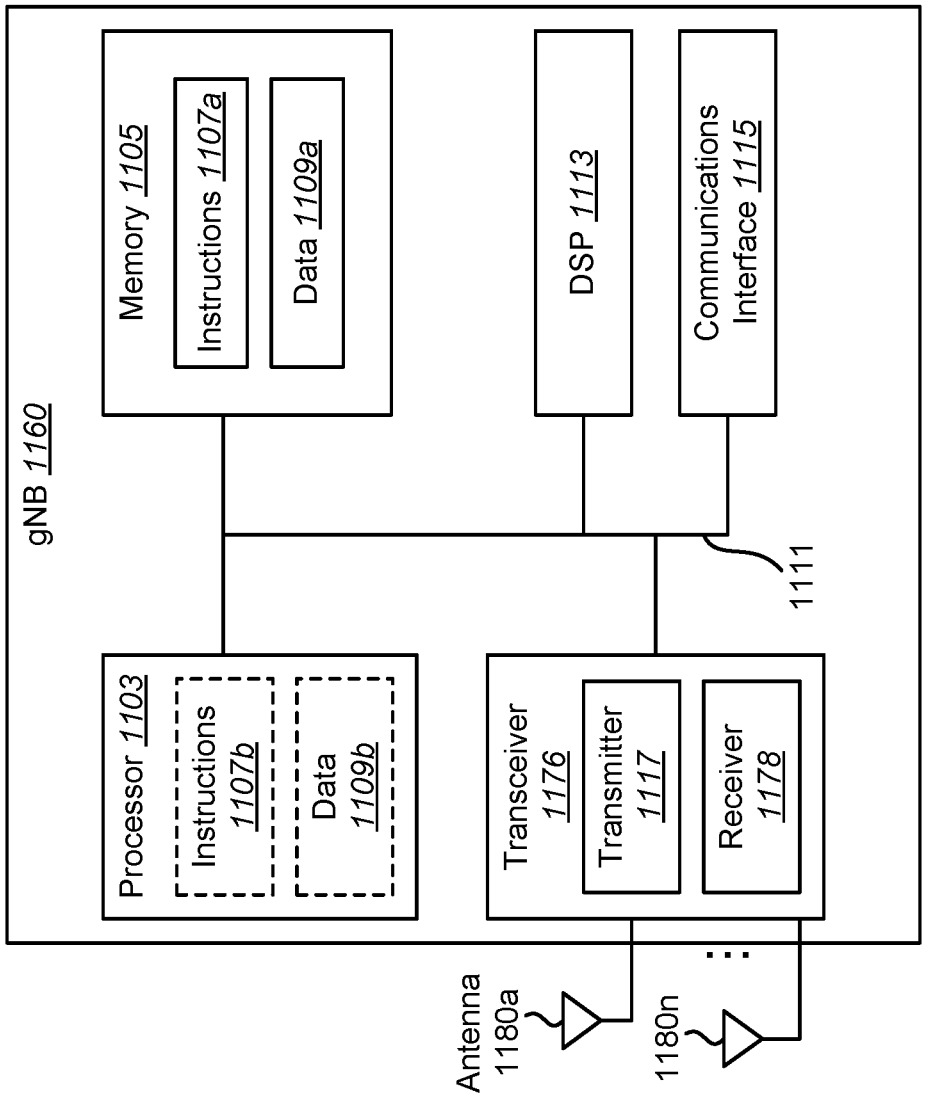
FIG. 3 illustrates various components that may be utilized in a gNB.

FIG. 3 illustrates various components that may be utilized in a gNB 1160. The gNB 1160 described in connection with FIG. 3 may be implemented in accordance with the gNB 160 described in connection with FIG. 1. The gNB 1160 includes a processor 1103 that controls operation of the gNB 1160. The processor 1103 may also be referred to as a central processing unit (CPU). Memory 1105, which may include read-only memory (ROM), random access memory (RAM), a combination of the two or any type of device that may store information, provides instructions 1107a and data 1109a to the processor 1103. A portion of the memory 1105 may also include non-volatile random access memory (NVRAM). Instructions 1107b and data 1109b may also reside in the processor 1103. Instructions 1107b and/or data 1109b loaded into the processor 1103 may also include instructions 1107a and/or data 1109a from memory 1105 that were loaded for execution or processing by the processor 1103. The instructions 1107b may be executed by the processor 1103 to implement the methods described above.

The gNB 1160 may also include a housing that contains one or more transmitters 1117 and one or more receivers 1178 to allow transmission and reception of data. The transmitter(s) 1117 and receiver(s) 1178 may be combined into one or more transceivers 1176. One or more antennas 1180a-n are attached to the housing and electrically coupled to the transceiver 1176.

The various components of the gNB 1160 are coupled together by a bus system 1111, which may include a power bus, a control signal bus and a status signal bus, in addition to a data bus. However, for the sake of clarity, the various buses are illustrated in FIG. 3 as the bus system 1111. The gNB 1160 may also include a digital signal processor (DSP) 1113 for use in processing signals. The gNB 1160 may also include a communications interface 1115 that provides user access to the functions of the gNB 1160. The gNB 1160 illustrated in FIG. 3 is a functional block diagram rather than a listing of specific components.

Figure 4:
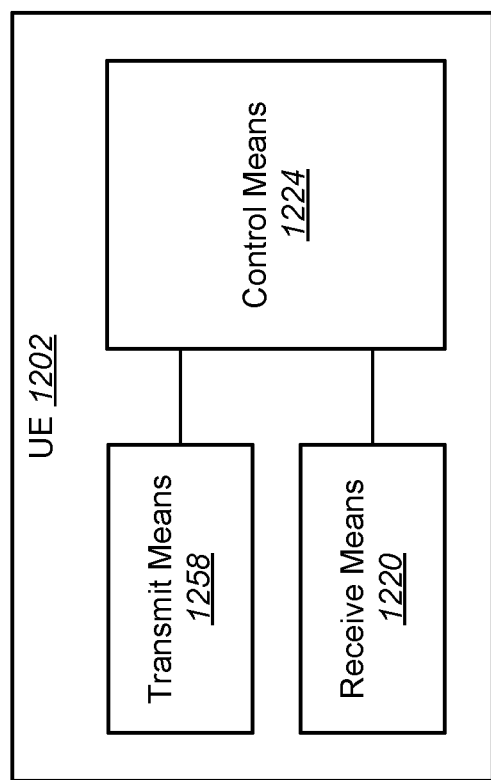
FIG. 4 is a block diagram illustrating one implementation of a UE in which systems and methods for performing uplink transmissions may be implemented.

FIG. 4 is a block diagram illustrating one implementation of a UE 1202 in which systems and methods for performing uplink transmissions may be implemented. The UE 1202 includes transmit means 1258, receive means 1220 and control means 1224. The transmit means 1258, receive means 1220 and control means 1224 may be configured to perform one or more of the functions described in connection with FIG. 1 above. FIG. 2 above illustrates one example of a concrete apparatus structure of FIG. 4. Other various structures may be implemented to realize one or more of the functions of FIG. 1. For example, a DSP may be realized by software.

Figure 5:
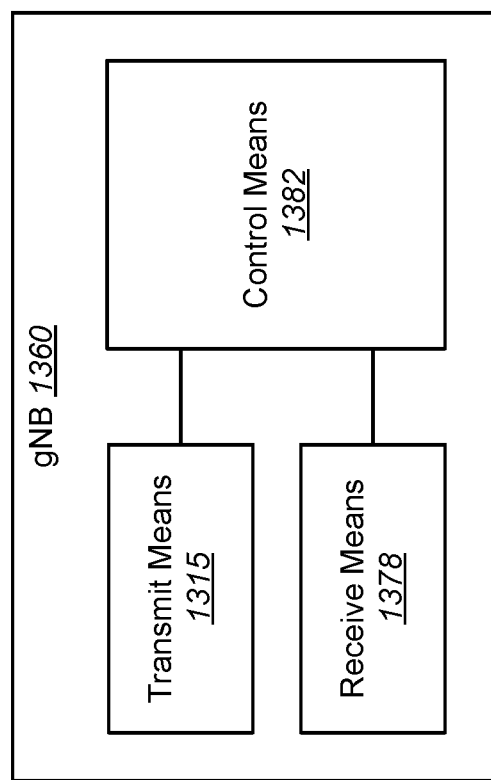
FIG. 5 is a block diagram illustrating one implementation of a gNB in which systems and methods for performing uplink transmissions may be implemented.

FIG. 5 is a block diagram illustrating one implementation of a gNB 1360 in which systems and methods for performing uplink transmissions may be implemented. The gNB 1360 includes transmit means 1317, receive means 1378 and control means 1382. The transmit means 1317, receive means 1378 and control means 1382 may be configured to perform one or more of the functions described in connection with FIG. 1 above. FIG. 3 above illustrates one example of a concrete apparatus structure of FIG. 5. Other various structures may be implemented to realize one or more of the functions of FIG. 1. For example, a DSP may be realized by software.

Figure 6:
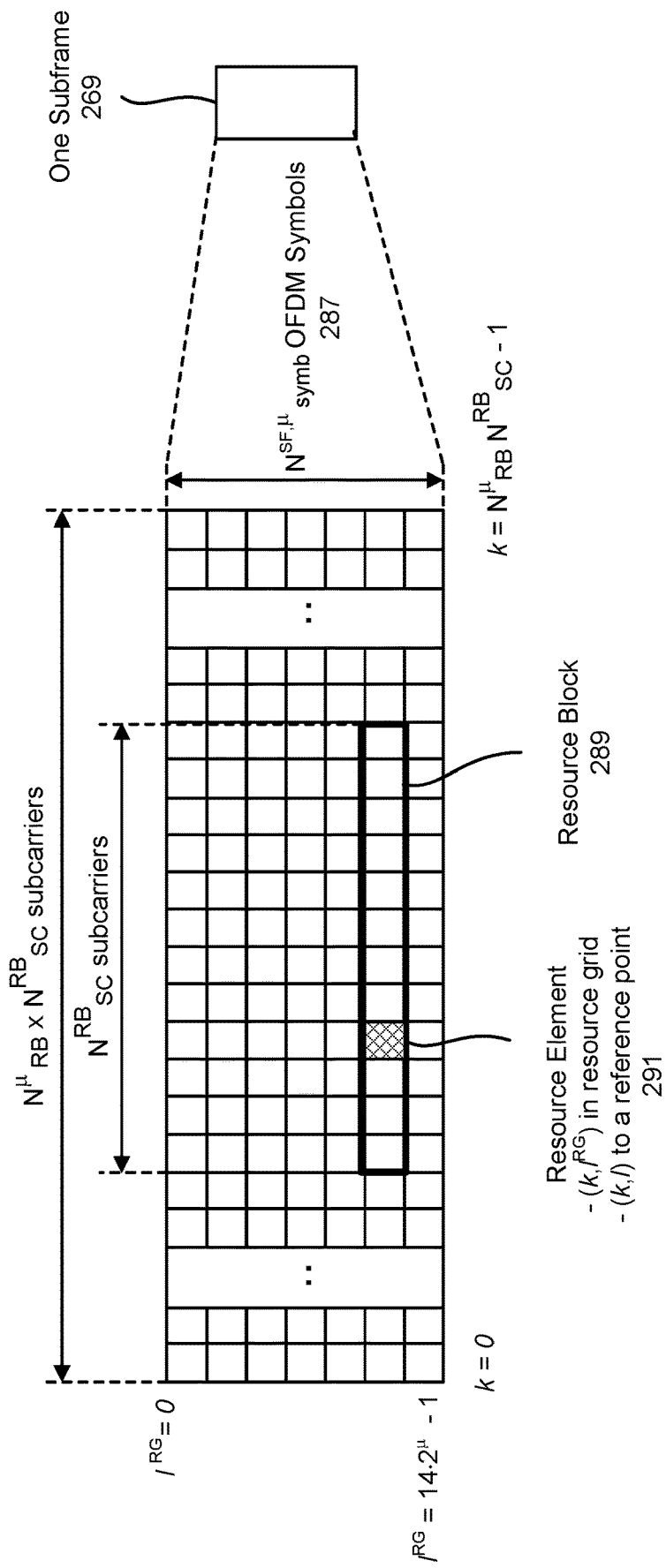
FIG. 6 is a diagram illustrating one example of a resource.

FIG. 6 is a diagram illustrating one example of a resource grid. The resource grid illustrated in FIG. 6 may be applicable for both downlink and uplink and may be utilized in some implementations of the systems and methods disclosed herein. More detail regarding the resource grid is given in connection with FIG. 1.

In FIG. 6, one subframe 269 may include one or several slots 283. For a given numerology $\mu$, $N^{\mu}_{RB}$ is bandwidth configuration of the serving cell, expressed in multiples of $N^{RB}_{sc}$, where $N^{RB}_{sc}$ is a resource block 289 size in the frequency domain expressed as a number of subcarriers, and $N^{SF,\mu}_{symb}$ is the number of Orthogonal Frequency Division Multiplexing (OFDM) symbols 287 in a subframe 269. In other words, For each numerology $\mu$ and for each of downlink and uplink, a resource grid of $N^{\mu}_{RB}N^{RB}_{sc}$ subcarriers and $N^{SF,\mu}_{symb}$ OFDM symbols may be defined. There may be one resource grid per antenna port p, per subcarrier spacing configuration (i.e. numerology) $\mu$, and per transmission direction (uplink or downlink). A resource block 289 may include a number of resource elements (RE) 291.

Multiple OFDM numerologies (also referred to as just numerologies) are supported as given by Table X1. Each of the numerologies may be tied to its own subcarrier spacing $\Delta f$.

TABLE X1

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |

TABLE X1-continued

| $\mu$ | $\Delta f = 2^{\mu} \cdot 15$ [kHz] | Cyclic prefix |
|---|---|---|
| 3 | 120 | Normal |
| 4 | 240 | Normal |
| 5 | 480 | Normal |

For subcarrier spacing configuration $\mu$, slots are numbered $n^{\mu}_s \in (0, \ldots, N^{SF,\mu}_{slot}-1)$ in increasing order within a subframe and $n^{\mu}_{s,f} \in (0, \ldots, N^{frame,\mu}_{slot}-1)$ in increasing order within a frame. There are $N^{slot,\mu}_{symb}$ consecutive OFDM symbols in a slot where $N^{slot,\mu}_{symb}$ depends on the subcarrier spacing used and the slot configuration as given by Table X2 for normal cyclic prefix and Table X3 for extended cyclic prefix. The number of consecutive OFDM symbols per subframe is $N^{SF,\mu}_{symb} = N^{slot,\mu}_{symb} \cdot N^{SF,\mu}_{slot}$. The start of slot $n^{\mu}_s$ in a subframe is aligned in time with the start of OFDM symbol $n^{\mu}_s \cdot N^{slot,\mu}_{symb}$ in the same subframe. Not all UEs may be capable of simultaneous transmission and reception, implying that not all OFDM symbols in a downlink slot or an uplink slot may be used.

TABLE X2

| | Slot configuration | | | | | |
|---|---|---|---|---|---|---|
| | 0 | | | 1 | | |
| $\mu$ | $N^{slot,\mu}_{symb}$ | $N^{frame,\mu}_{slot}$ | $N^{SF,\mu}_{slot}$ | $N^{slot,\mu}_{symb}$ | $N^{frame,\mu}_{slot}$ | $N^{SF,\mu}_{slot}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE X3

| | Slot configuration | | | | | |
|---|---|---|---|---|---|---|
| | 0 | | | 1 | | |
| $\mu$ | $N^{slot,\mu}_{symb}$ | $N^{frame,\mu}_{slot}$ | $N^{SF,\mu}_{slot}$ | $N^{slot,\mu}_{symb}$ | $N^{frame,\mu}_{slot}$ | $N^{SF,\mu}_{slot}$ |
| 2 | 12 | 40 | 4 | 6 | 80 | 8 |

For a PCell, $N^{\mu}_{RB}$ is broadcast as a part of system information. For an SCell (including a Licensed-Assisted Access (LAA) SCell), $N^{\mu}_{RB}$ is configured by a RRC message dedicated to a UE 102. For PDSCH mapping, the available RE 291 may be the RE 291 whose index l fulfills $l \geq l_{data,start}$ and/or $l_{data,end} \geq l$ in a subframe.

The OFDM access scheme with cyclic prefix (CP) may be employed, which may be also referred to as CP-OFDM. In the downlink, PDCCH, EPDCCH (Enhanced Physical Downlink Control Channel), PDSCH and the like may be transmitted. A radio frame may include a set of subframes 269 (e.g. 10 subframes). The RB is a unit for assigning downlink radio resources, defined by a predetermined bandwidth (RB bandwidth) and one or more OFDM symbols.

A resource block is defined as $N^{RB}_{sc}=12$ consecutive subcarriers in the frequency domain.

Carrier resource blocks are numbered from 0 to $N^{\mu}_{RB}-1$ in the frequency domain for subcarrier spacing configuration. The relation between the carrier resource block number $n_{CRB}$ in the frequency domain and resource elements (k,l) is given by $n_{CRB}=\text{floor}(k/N^{RB}_{sc})$ where k is defined relative to the resource grid. Physical resource blocks are defined within a carrier bandwidth part (BWP) and numbered from 0 to $N^{size}_{BWP,i}-1$ where i is the number of the carrier bandwidth part. The relation between physical and absolute resource blocks in carrier bandwidth part i is given by $n_{CRB}=n_{PRB}+N^{start}_{BWP,i}-1$, where $N^{start}_{BWP,i}$ is the carrier resource block where carrier bandwidth part starts. Virtual resource blocks are defined within a carrier bandwidth part and numbered from 0 to $N^{size}_{BWP,i}-1$ where i is the number of the carrier bandwidth part.

A carrier bandwidth part is a contiguous set of physical resource blocks, selected from a contiguous subset of the carrier resource blocks for a given numerology μ on a given carrier. The number of resource blocks $N^{size}_{BWP,i}$ in a carrier BWP may fulfil $N^{min,\mu}_{RB,x} <= N^{size}_{BWP,i} <= N^{max,\mu}_{RB,x}$. A UE can be configured with up to four carrier bandwidth parts in the downlink with a single downlink carrier bandwidth part being active at a given time. The UE is not expected to receive PDSCH or PDCCH outside an active bandwidth part. A UE can be configured with up to four carrier bandwidth parts in the uplink with a single uplink carrier bandwidth part being active at a given time. The UE shall not transmit PUSCH or PUCCH outside an active bandwidth part.

The RB may include twelve sub-carriers in frequency domain and one or more OFDM symbols in time domain. A region defined by one sub-carrier in frequency domain and one OFDM symbol in time domain is referred to as a resource element (RE) and is uniquely identified by the index pair $(k,l^{RG})$ in the resource grid, where $k=0 \ldots, N^{\mu}_{RB}N^{RB}_{sc}-1$ and $l^{RG}=0, \ldots, N^{SF,\mu}_{symb}-1$ are indices in the frequency and time domains, respectively. Moreover, RE is uniquely identified by the index pair (k,l) based on a certain reference point, where l are indices in the time domain. The reference point can be based on the resource grid, i.e. component carrier (CC) basis. Alternatively the reference point can be based on a certain band width part in the component carrier. While subframes in one CC are discussed herein, subframes are defined for each CC and subframes are substantially in synchronization with each other among CCs.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PDSCH, Physical Random Access Channel (PRACH) and the like may be transmitted.

For each numerology and carrier, a resource grid of $N^{max,\mu}_{RB,x}N^{RB}_{sc}$ subcarriers and $N^{SF,\mu}_{symb}$ OFDM symbols is defined, where $N^{max,\mu}_{RB,x}$ is given by Table X4 and x is DL or UL for downlink and uplink, respectively. There is one resource grid per antenna port p, per subcarrier spacing configuration μ, and per transmission direction (downlink or uplink).

TABLE X4

| μ | $N^{min,\mu}_{RB,DL}$ | $N^{max,\mu}_{RB,DL}$ | $N^{min,\mu}_{RB,UL}$ | $N^{max,\mu}_{RB,UL}$ |
| --- | --- | --- | --- | --- |
| 0 | 20 | 275 | 24 | 275 |
| 1 | 20 | 275 | 24 | 275 |
| 2 | 20 | 275 | 24 | 275 |
| 3 | 20 | 275 | 24 | 275 |
| 4 | 20 | 138 | 24 | 138 |
| 5 | 20 | 69 | 24 | 69 |

A UE 102 may be instructed to receive or transmit using a subset of the resource grid only. The set of resource blocks a UE is referred to as a carrier bandwidth part and may be configured to receive or transmit upon are numbered from 0 to $N^{\mu}_{RB}-1$ in the frequency domain. The UE may be configured with one or more carrier bandwidth parts, each of which may have the same or different numerology.

Transmissions in multiple cells can be aggregated where up to fifteen secondary cells can be used in addition to the primary cell. A UE 102 configured for operation in bandwidth parts (BWPs) of a serving cell, is configured by higher layers for the serving cell a set of at most four bandwidth parts (BWPs) for receptions by the UE (DL BWP set) in a DL bandwidth by parameter DL-BWP-index and a set of at most four BWPs for transmissions by the UE 102 (UL BWP set) in an UL bandwidth by parameter UL-BWP-index for the serving cell. For unpaired spectrum operation, a DL BWP from the set of configured DL BWPs is linked to an UL BWP from the set of configured UL BWPs, where the DL BWP and the UL BWP have a same index in the respective sets. For unpaired spectrum operation, a UE 102 can expect that the center frequency for a DL BWP is same as the center frequency for a UL BWP.

One or more sets of PRB(s) may be configured for DL control channel monitoring. In other words, a control resource set is, in the frequency domain, a set of PRBs within which the UE 102 attempts to blindly decode downlink control information (i.e., monitor downlink control information (DCI)), where the PRBs may or may not be frequency contiguous, a UE 102 may have one or more control resource sets, and one DCI message may be located within one control resource set. In the frequency-domain, a PRB is the resource unit size (which may or may not include DMRS) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Namely, a UE 102 may have to monitor a set of PDCCH candidates in one or more control resource sets on one or more activated serving cells or bandwidth parts (BWPs) according to corresponding search spaces where monitoring implies decoding each PDCCH candidate according to the monitored DCI formats. Here, the PDCCH candidates may be candidates for which the PDCCH may possibly be assigned and/or transmitted. A PDCCH candidate is composed of one or more control channel elements (CCEs). The term "monitor" means that the UE 102 attempts to decode each PDCCH in the set of PDCCH candidates in accordance with all the DCI formats to be monitored.

The set of PDCCH candidates that the UE 102 monitors may be also referred to as a search space. That is, the search space is a set of resource that may possibly be used for PDCCH transmission.

Furthermore, a common search space (CSS) and a user-equipment search space (USS) are set (or defined, configured) in the PDCCH resource region. For example, the CSS may be used for transmission of DCI to a plurality of the UEs 102. That is, the CSS may be defined by a resource common to a plurality of the UEs 102. For example, the CSS is composed of CCEs having numbers that are predetermined between the gNB 160 and the UE 102. For example, the CSS is composed of CCEs having indices 0 to 15.

Here, the CSS may be used for transmission of DCI to a specific UE 102. That is, the gNB 160 may transmit, in the CSS, DCI format(s) intended for a plurality of the UEs 102 and/or DCI format(s) intended for a specific UE 102. There may be one or more types of CSS. For example, Type 0 PDCCH CSS may be defined for a DCI format scrambled by a System Information-Radio Network Temporary Identifier (SI-RNTI) on PCell. Type 1 PDCCH CSS may be defined for a DCI format scrambled by a Random Access- (RA-) RNTI. Additionally and/or alternatively, Type 1 PDCCH CSS may be used for a DCI format scrambled by a Temporary Cell- (TC-)RNTI or Cell- (C-)RNTI. Type 2 PDCCH CSS may be defined for a DCI format scrambled by a Paging- (P-)RNTI. Type 3 PDCCH CSS may be defined for a DCI format scrambled by an Interval- (INT-)RNTI, where if a UE 102 is configured by higher layers to decode a DCI format with CRC scrambled by the INT-RNTI and if the UE 102 detects the DCI format with CRC scrambled by the INT-RNTI, the UE 102 may assume that no transmission to the UE 102 is present in OFDM symbols and resource blocks indicated by the DCI format. Additionally and/or alternatively, Type 3 PDCCH CSS may be used for a DCI format scrambled by the other RNTI (e.g. Transmit Power Control- (TPC-)RNTI, Pre-emption Indication- (PI-)RNTI, Slot Format- (SF-)RNTI, Semi persistent scheduling- (SPS-)RNTI, Grant free- (GF-)RNTI).

A UE may be indicated by System Information Block Type0 (SIB0), which is also referred to as MIB, a control resource set for Type0-PDCCH common search space and a subcarrier spacing and a CP length for PDCCH reception. The Type0-PDCCH common search space is defined by the CCE aggregation levels and the number of candidates per CCE aggregation level. The UE may assume that the DMRS antenna port associated with PDCCH reception in the Type0-PDCCH common search space and the DMRS antenna port associated with Physical Broadcast channel (PBCH) reception are quasi-collocated with respect to delay spread, Doppler spread, Doppler shift, average delay, and spatial Rx parameters. PBCH carries Master Information Block (MIB) which contains most important pieces of system information. A PDCCH with a certain DCI format in Type0-PDCCH common search space schedules a reception of a PDSCH with SIB Type1 (SIB1) or with other SI messages. A UE may be indicated by SIB1 control resource set(s) for Type1-PDCCH common search space. A subcarrier spacing and a CP length for PDCCH reception with Type1-PDCCH common search space are same as for PDCCH reception with Type0-PDCCH common search space. The UE may assume that the DMRS antenna port associated with PDCCH reception in the Type1-PDCCH common search space and the DMRS antenna port associated with PBCH reception are quasi-collocated with respect to delay spread, Doppler spread, Doppler shift, average delay, and spatial Rx parameters. A monitoring periodicity of paging occasions for PDCCH in Type2-PDCCH common search space may be configured to the UE by higher layer parameter. A UE may be configured by higher layer signaling whether and/or which serving cell(s) to monitor Type3-PDCCH common search space.

The USS may be used for transmission of DCI to a specific UE 102. That is, the USS is defined by a resource dedicated to a certain UE 102. That is, the USS may be defined independently for each UE 102. For example, the USS may be composed of CCEs having numbers that are determined based on a RNTI assigned by the gNB 160, a slot number in a radio frame, an aggregation level, or the like.

Here, the RNTI(s) may include C-RNTI (Cell-RNTI), Temporary C-RNTI. Also, the USS (the position(s) of the USS) may be configured by the gNB 160. For example, the gNB 160 may configure the USS by using the RRC message. That is, the base station may transmit, in the USS, DCI format(s) intended for a specific UE 102.

Here, the RNTI assigned to the UE 102 may be used for transmission of DCI (transmission of PDCCH). Specifically, CRC (Cyclic Redundancy Check) parity bits (also referred to simply as CRC), which are generated based on DCI (or DCI format), are attached to DCI, and, after attachment, the CRC parity bits are scrambled by the RNTI. The UE 102 may attempt to decode DCI to which the CRC parity bits scrambled by the RNTI are attached, and detects PDCCH (i.e., DCI, DCI format). That is, the UE 102 may decode PDCCH with the CRC scrambled by the RNTI.

When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

DCI formats may be classified into at least 4 types, DL regular, UL regular, DL fallback and UL fallback. The DL regular DCI format and the UL regular DCI format may have a same DCI payload size. The DL fallback DCI format and the UL fallback DCI format may have a same DCI payload size. Table X5, X6, X7, and X8 show examples of the DL regular DCI format, the UL regular DCI format, the DL fallback DCI format, and the UL fallback DCI format, respectively. "Mandatory" may mean the information field is always present irrespective of RRC (re)configuration. "Optional" may mean the information field may or may not be present depending on RRC (re)configuration. In the DL fallback DCI format and the UL fallback DCI format, all information fields are mandatory so that their DCI payload sizes are fixed irrespective of RRC (re)configuration.

TABLE X5

| Information field | The number of bits | Mandatory/Optional | Remarks |
| --- | --- | --- | --- |
| Header | 2 | Mandatory | The header is used to distinguish different DCI formats with the same DCI size |
| Carrier indicator | 0 or 3 | Optional | |

TABLE X5-continued

| Information field | The number of bits | Mandatory/ Optional | Remarks |
|---|---|---|---|
| Frequency-domain PDSCH resources | 25 | Mandatory | VRBs, indiacated using type 0 or type 1 resource allocation |
| Time-domain PDSCH resources | 2 | Mandatory | Index into an RRC-configured table providing the set of OFDM symbols used for PDSCH transmission |
| VRB-to-PRB mapping | 1 | Optional | Flag to control VRB-to-PRB mapping |
| Reserved resources | 1 | Optional | Indicate whether reserved resources should be excluded form the PDSCH allocation. |
| Bundling size | 1 | Optional | Select from two RRC configured bundling sies for PDSCH |
| Modulation and coding scheme | 5 | Mandatory | MCS |
| New data indicator | 1 | Mandatory | |
| Redundancy version | 2 | Mandatory | |
| Modulation and coding scheme, second CW | 0 or 5 | Optional | |
| New data indicator, second CW | 0 or 1 | Optional | |
| Redundancy version, second CW | 0 or 2 | Optional | |
| HARQ process number | 3 | Mandatory | |
| CBGFI | 1 | Optional | Code block group (CBG) flush indication. Consists of 1 bit if CBG retransmission configured. |
| CBGTI | 4 | Optional | Indicates the CBG(s) (re)transmitted. Consists of N bits bitmap if CBG is configured. |
| TPC command for PUCCH | 2 | Mandatory | |
| ARI (ACK/NAK Resource Index) | 2 | Mandatory | |
| HARQ timing indicator | 2 | | To indicate the timing of the ACK relative to the PDSCH reception |
| Downlink Assignment Index | 4 | Optional | DAI (counter DAI and total DAI) |
| Antenna port(s) | 2 | Optional | Antenna ports used (and the number of layers) |
| TCI (Transmission Configuration Indication) | 2 | Optional | Provides beam indication to indicate QCL assumption between DL RS antenna port(s) and DMRS antenna port(s) of DL data channel at least w.r.t. spatial QCL parameter |
| CSI request | 4 | Optional | CSI measurement request and CSI report trigger for CSI on PUCCH |

TABLE X6

| Information field | The number of bits | Mandatory/ Optional | Remarks |
|---|---|---|---|
| Header | 2 | Mandatory | The header is used to distinguish different DCI formats with the same DCI size |
| Carrier indicator | 0 | Optional | |
| Frequency-domain PDSCH resources | 25 | Mandatory | VRBs, indiacated using type 0 or type 1 resource allocation |

TABLE X6-continued

| Information field | The number of bits | Mandatory/ Optional | Remarks |
|---|---|---|---|
| Time-domain PDSCH resources | 2 | Mandatory | Index into an RRC-configured table providing the set of OFDM symbols used for PUSCH transmission |
| VRB-to-PRB mapping | 1 | Mandatory | Flag to control VRB-to-PRB mapping |
| UCI on PUSCH information | 2 | Optional | Indication of beta value for UCI on PUSCH, possibly also other UCI-on-PUSCH-related information |
| Modulation and coding scheme | 5 | Mandatory | MCS |
| New data indicator | 1 | Mandatory | |
| Redundancy version | 2 | Mandatory | |
| HARQ process number | 3 | Mandatory | HARQ process number, 3 or 4 bits |
| CBGTI | 4 | Optional | Indicates the CBG(s) (re)transmitted. Consists of N bits bitmap if CBG is configured. |
| TPC command for PUSCH | 2 | Mandatory | |
| SRI/TRI/TPMI | 4 | Optional | SRS resource indicator, TPMI, and Transmission rank indicator jointly encoded. At least 4 bits is used with 1 SRS resource. |
| Antenna ports | 2 | Optional | Antenna ports, scrambling identity |
| SRS request | 4 | Optional | To trigger an SRS transmission in the uplink. |
| CSI request | 4 | Mandatory | CSI measurement request and CSI report trigger for CSI on PUSCH |

TABLE X7

| Information field | The number of bits | Mandatory/ Optional | Remarks |
|---|---|---|---|
| Header | 2 | Mandatory | The header is used to distinguish different DCI formats with the same DCI size |
| Frequency-domain PDSCH resources | 15 | Mandatory | VRBs indicated using type 1. Fixed BW or dependent on some BW provided by sysinfo (cannot be reconfigurable for the fallback format) |
| Time-domain PDSCH resources | 2 | Mandatory | Index into an preconfigured table providing the set of OFDM symbols used for PDSCH transmission |
| VRB-to-PRB mapping | 1 | Mandatory | Flag to control VRB-to-PRB mapping |
| Reserved resources | 1 | Mandatory | Indicate whether reserved resources should be excluded form the PDSCH allocation. |
| Modulation and coding scheme | 5 | Mandatory | Only single-layer transmission in fallback |
| New data indicator | 1 | Mandatory | |
| Redundancy version | 2 | Mandatory | |
| HARQ process number | 3 | Mandatory | |
| TPC command for PUCCH | 2 | Mandatory | |
| ARI (ACK/NAK Resource Index) | 2 | Mandatory | |
| Downlink Assignment Index | 2 | Mandatory | |
| Antenna port(s) | 2 | Mandatory | |

TABLE X7-continued

| Information field | The number of bits | Mandatory/ Optional | Remarks |
|---|---|---|---|
| TCI (Transmission Configuration Information) | 2 | | |

TABLE X8

| Information field | The number of bits | Mandatory/ Optional | Remarks |
|---|---|---|---|
| Header | 2 | Mandatory | The header is used to distinguish different DCI formats with the same DCI size |
| Frequency-domain PUSCH resources | 15 | Mandatory | VRBs indicated using type 1. Fixed BW or dependent on some BW provided by sysinfo (cannot be reconfigurable for the fallback format) |
| Time-domain PUSCH resources | 2 | Mandatory | Index into an preconfigured table providing the set of OFDM symbols used for PDSCH transmission |
| VRB-to-PRB mapping | 1 | Mandatory | Flag to control VRB-to-PRB mapping |
| Modulation and coding scheme | 5 | Mandatory | Only single-layer transmission in fallback |
| New data indicator | 1 | Mandatory | |
| Redundancy version | 2 | Mandatory | |
| HARQ process number | 3 | Mandatory | |
| TPC command for PUSCH | 2 | Mandatory | |
| SRI/TRI/TPMI | 4 | Mandatory | |
| AP/ID/layers | 2 | Mandatory | |

Figure 7:
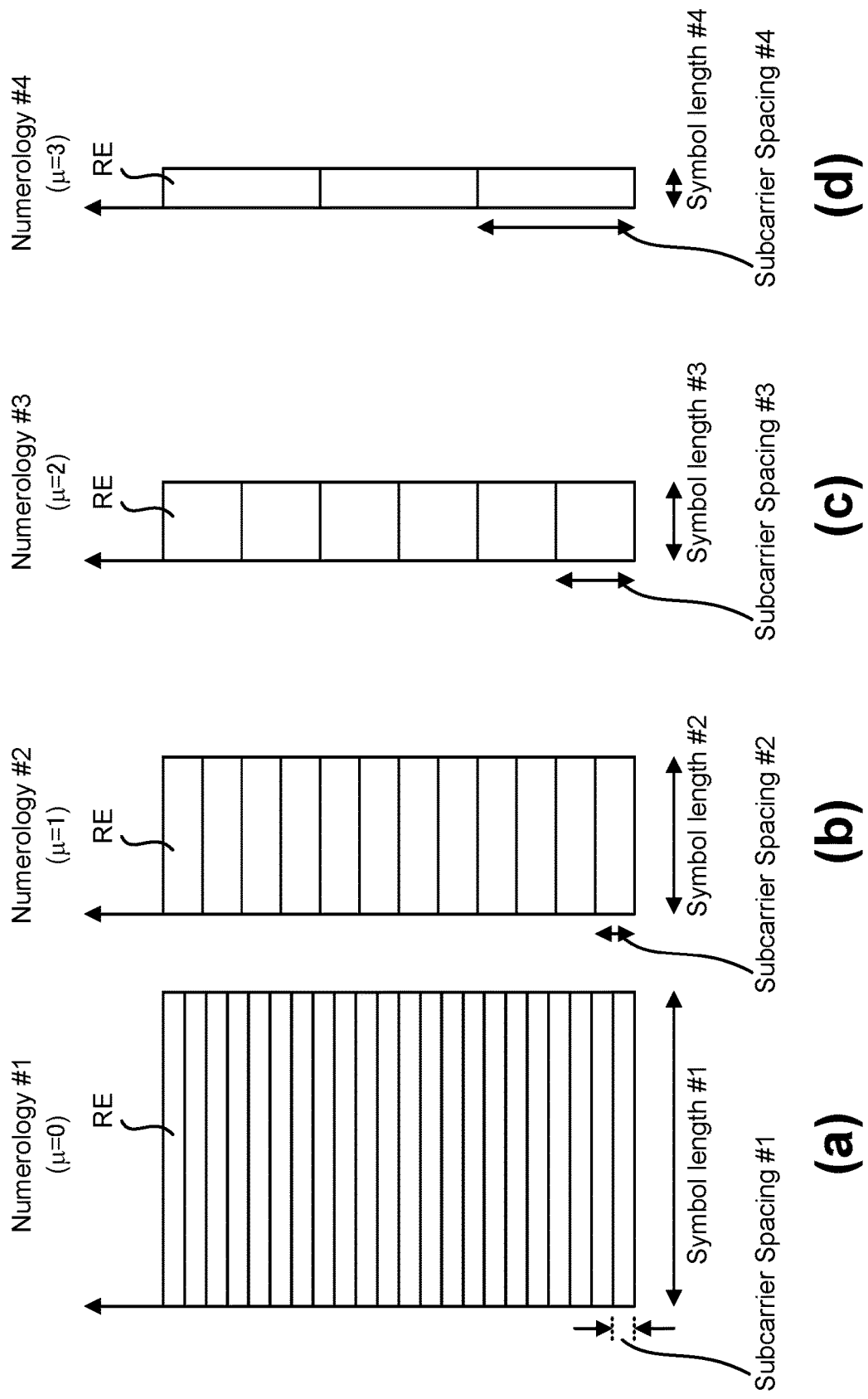
FIG. 7 shows examples of several numerologies.

FIG. 7 shows examples of several numerologies. The numerology #1 ($\mu=0$) may be a basic numerology. For example, a RE of the basic numerology is defined with subcarrier spacing of 15 kHz in frequency domain and $2048\kappa T_s+CP$ length (e.g., $512\kappa T_s$, $160\kappa T_s$ or $144\kappa T_s$) in time domain, where $T_s$ denotes a baseband sampling time unit defined as $1/(15000*2048)$ seconds. For the $\mu$-th numerology, the subcarrier spacing may be equal to $15*2^\mu$ and the effective OFDM symbol length $N\mu T_s = 2048*2^{-82} \kappa T_s$. It may cause the symbol length is $2048*2^{-82} \kappa T_s+CP$ length (e.g., $512*2^{-82} \kappa T_s$, $160*2^{-82} \kappa T_s$ or $144*2^{-82} \kappa T_s$). Note that $\kappa=64$, $T_s=1/(\Delta f_{max} \cdot N_f)$, $\Delta f_{max}=480 \cdot 10^3$ Hz (i.e. $\Delta f$ for $\mu=5$), and $N_f=4096$. In other words, the subcarrier spacing of the $\mu+1$-th numerology is a double of the one for the $\mu$-th numerology, and the symbol length of the $\mu+1$-th numerology is a half of the one for the $\mu$-th numerology. FIG. 7 shows four numerologies, but the system may support another number of numerologies.

Figure 8:
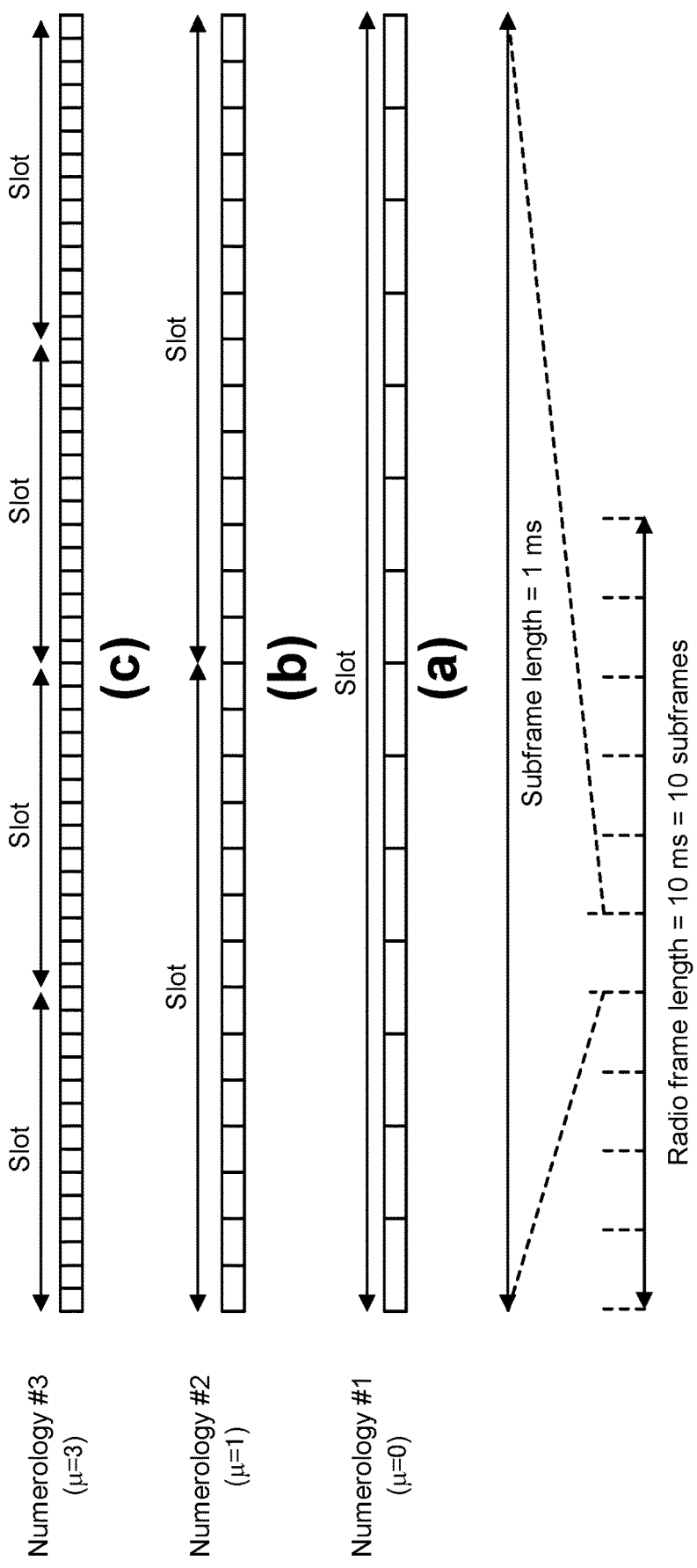
FIG. 8 shows examples of subframe structures for the numerologies that are shown in FIG. 7.

FIG. 8 shows a set of examples of subframe structures for the numerologies that are shown in FIG. 7. These examples are based on the slot configuration set to 0. A slot includes 14 symbols, the slot length of the $\mu+1$-th numerology is a half of the one for the $\mu$-th numerology, and eventually the number of slots in a subframe (i.e., 1 ms) becomes double. It may be noted that a radio frame may include 10 subframes, and the radio frame length may be equal to 10 ms.

Figure 9:
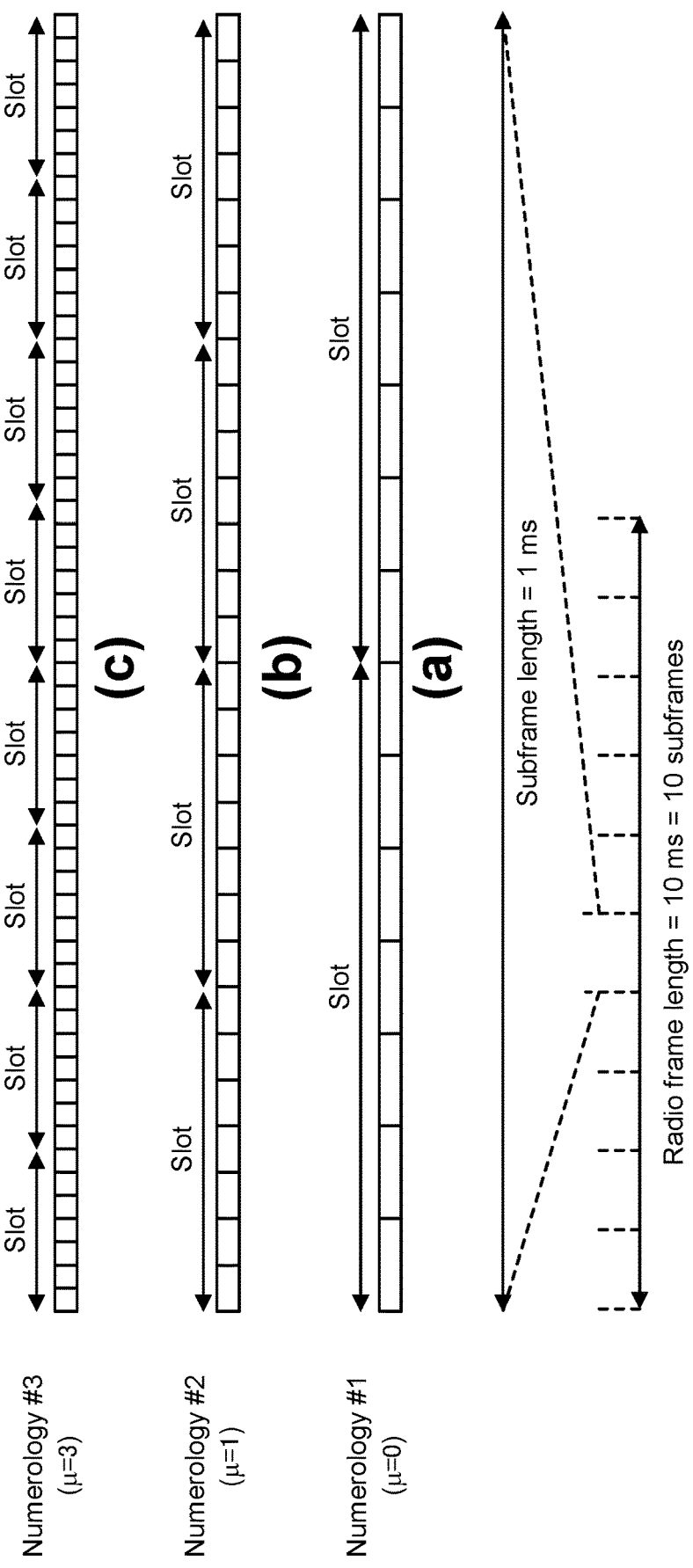
FIG. 9 shows examples of subframe structures for the numerologies that are shown in FIG. 7.

FIG. 9 shows another set of examples of subframe structures for the numerologies that are shown in FIG. 7. These examples are based on the slot configuration set to 1. A slot includes 7 symbols, the slot length of the $\mu+1$-th numerology is a half of the one for the $\mu$-th numerology, and eventually the number of slots in a subframe (i.e., 1 ms) becomes double.

Figure 10:
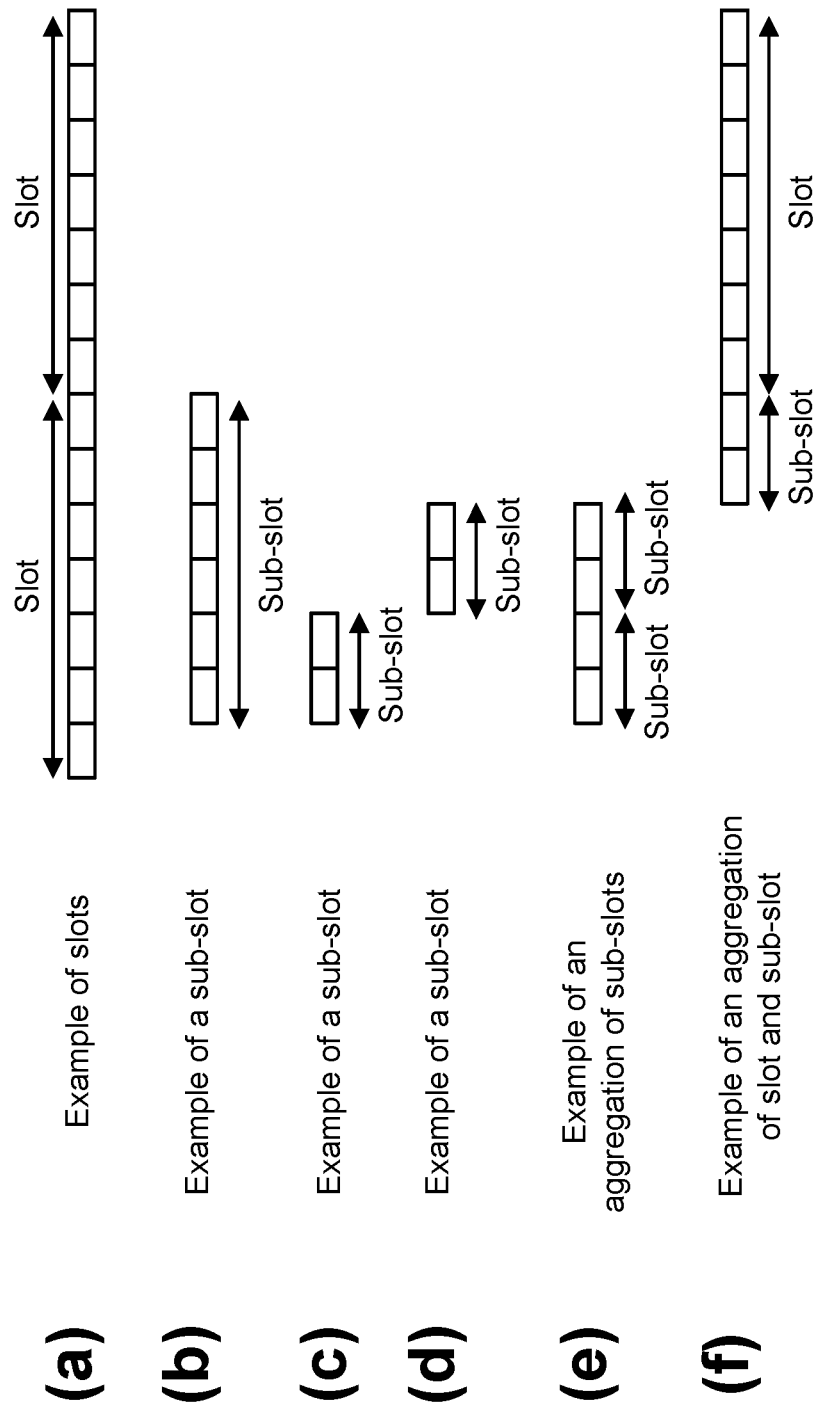
FIG. 10 shows examples of slots and sub-slots.

FIG. 10 shows examples of slots and sub-slots. If sub-slot (i.e. time domain resource allocation in unites of OFDM symbol or a set of a few OFDM symbols) is not configured by higher layer, the UE 102 and the gNB 160 may only use a slot as a scheduling unit. More specifically, a given transport block may be allocated to a slot. If the sub-slot is configured by higher layer, the UE 102 and the gNB 160 may use the sub-slot as well as the slot. The sub-slot may include one or more OFDM symbols. The maximum number of OFDM symbols that constitute the sub-slot may be $N^{SF,\mu}_{symb}-1$. The sub-slot length may be configured by higher layer signaling. Alternatively, the sub-slot length may be indicated by a physical layer control channel (e.g., by DCI format). The sub-slot may start at any symbol within a slot unless it collides with a control channel. There could be restrictions of mini-slot length based on restrictions on starting position. For example, the sub-slot with the length of $N^{SF,\mu}_{symb}-1$ may start at the second symbol in a slot. The starting position of a sub-slot may be indicated by a physical layer control channel (e.g., by DCI format). Alternatively, the starting position of a sub-slot may be derived from information (e.g., search space index, blind decoding candidate index, frequency and/or time resource indices, PRB index, a control channel element index, control channel element aggregation level, an antenna port index, etc) of the physical layer control channel which schedules the data in the concerned sub-slot. In cases when the sub-slot is configured, a given transport block may be allocated to either a slot, a sub-slot, aggregated sub-slots or aggregated sub-slot(s) and slot. This unit may also be a unit for HARQ-ACK bit generation.

Figure 11:
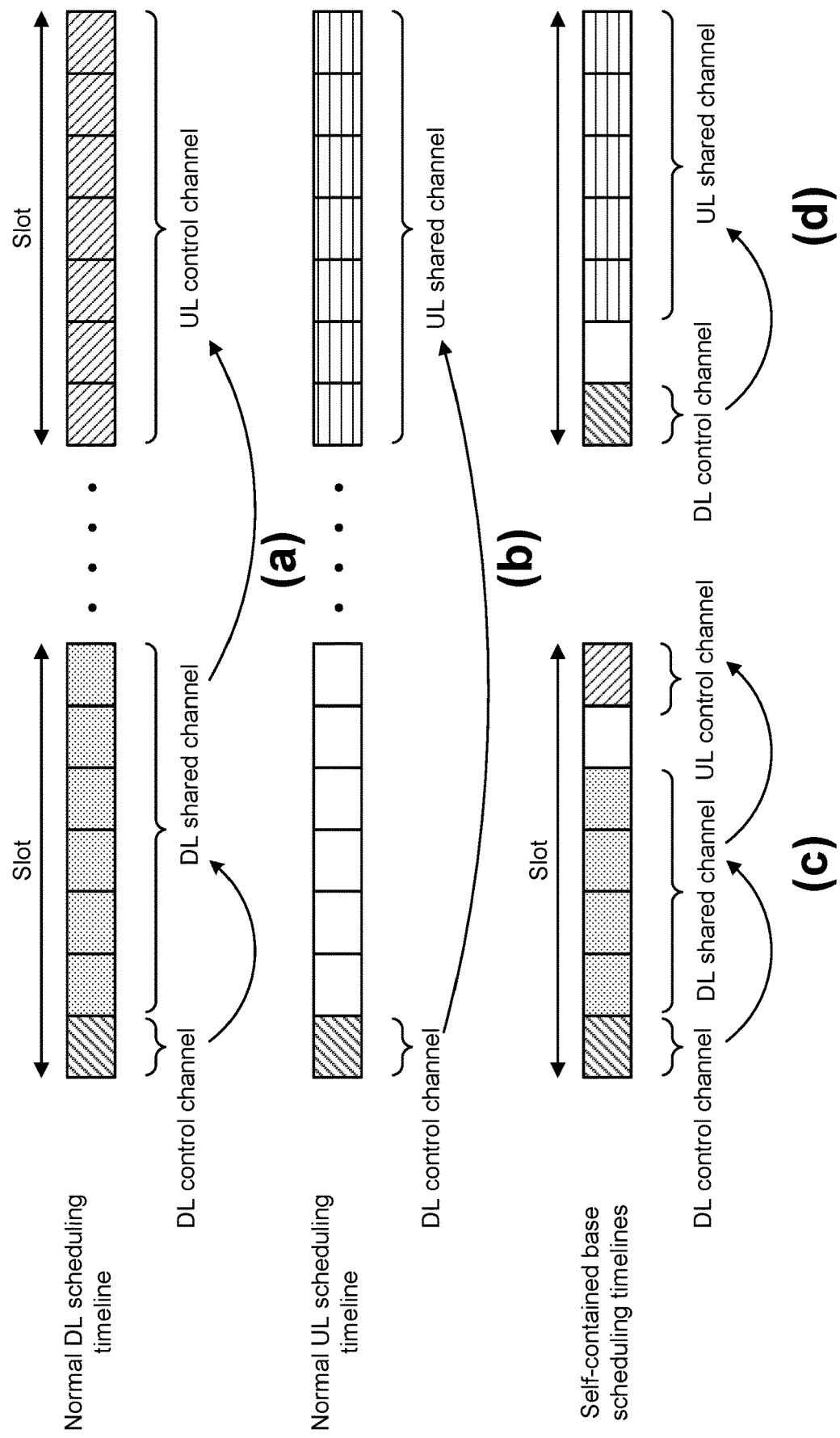
FIG. 11 shows examples of scheduling timelines.

FIG. 11 shows examples of scheduling timelines. For a normal DL scheduling timeline, DL control channels are mapped the initial part of a slot. The DL control channels schedule DL shared channels in the same slot. HARQ-ACKs for the DL shared channels (i.e., HARQ-ACKs each of which indicates whether or not transport block in each DL shared channel is detected successfully) are reported via UL control channels in a later slot. In this instance, a given slot may contain either one of DL transmission and UL transmission. For a normal UL scheduling timeline, DL control channels are mapped the initial part of a slot. The DL control channels schedule UL shared channels in a later slot. For these cases, the association timing (time shift) between the DL slot and the UL slot may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline, DL control channels are mapped the initial part of a slot. The DL control channels schedules DL shared channels in the same slot. HARQ-ACKs for the DL shared channels are reported UL control channels which are mapped at the ending part of the slot. For a self-contained base UL scheduling timeline, DL control channels are mapped the initial part of a slot. The DL control channels schedules UL shared channels in the same slot. For these cases, the slot may contain DL and UL portions, and there may be a guard period between the DL and UL transmissions. The use of self-contained slot may be upon a configuration of self-contained slot. Alternatively, the use of self-contained slot may be upon a configuration of the sub-slot. Yet alternatively, the use of self-contained slot may be upon a configuration of shortened physical channel (e.g., PDSCH, PUSCH, PUCCH, etc.).

Slot format indicator (SFI) may be defined to specify a format for one or more slot(s). With SFI, the UE 102 may be able to derive at least which symbols in a given slot that are 'DL', 'UL', and 'unknown', respectively. In addition, it may also indicate which symbols in a given slot that are 'reserved'. With SFI, the UE 102 may also be able to derive the number of slots for which the SFI indicates their formats. SFI may be configured by dedicated RRC configuration message. Alternatively and/or additionally, SFI may be signaled by a group-common PDCCH (e.g. PDCCH with SF-RNTI). Yet alternatively and/or additionally, SFI may be broadcasted via master information block (MIB) or remaining minimum system information (RMSI).

For example, 3 bit SFI can express up to 8 combinations of 'DL', 'UL', 'Unknown' and 'reserved', each combination consists of $N^{slot,\mu}_{symb}$ pieces of symbol types. More specifically, given that $N^{slot,\mu}_{symb}=14$, one combination may be 'Unknown' 'Unknown' 'Unknown' 'Unknown' 'Unknown' 'Unknown' 'Unknown' 'Unknown' 'Unknown' 'Unknown' 'Unknown' 'Unknown' 'Unknown' 'Unknown'. Another combination may be all 'DL, that is 'DL' 'DL' 'DL' 'DL' 'DL' 'DL' 'DL' 'DL' 'DL' 'DL' 'DL' 'DL' 'DL' 'DL'. Yet another combination may be all 'UL, that is 'UL' 'UL' 'UL' 'UL' 'UL' 'UL' 'UL' 'UL' 'UL' 'UL' 'UL' 'UL' 'UL' 'UL'. Yet another combination may be a combination of 'DL', 'UL' and 'Reserved' such as 'DL' 'DL' 'DL' 'DL' 'DL' 'DL' 'DL' 'DL' 'Reserved' 'Reserved' 'Reserved' 'Reserved' 'UL'.

'DL' symbols may be available for DL receptions and CSI/RRM measurements at the UE 102 side. 'UL' symbols may be available for UL transmissions at the UE 102 side. 'Unknown' resource may also be referred to as 'flexible' and can be overridden by at least by DCI indication. 'Unknown' may be used to achieve the same as 'Reserved' if not overridden by DCI and/or SFI indication. 'Reserved' resource may be 'not transmit' and 'not receive' but cannot be overridden by DCI/SFI indication. On 'Unknown' symbols, UE 102 may not be allowed to assume any DL and UL transmissions which are configured by higher-layer but not indicated by DCI/SFI indications, for example, periodic CSI-RS, periodic CSI-IM, semi-persistently scheduled CSI-RS, periodic CSI reporting, semi-persistently scheduled CSI reporting, periodic SRS transmission, higher-layer configured Primary synchronization signal (PSS)/secondary SS (SSS)/PBCH.

The overriding of 'Unknown' symbols by the DCI means that UE 102 may have to assume only DL and UL transmissions (PDSCH transmission, PUSCH transmission, aperiodic CSI-RS transmission, aperiodic CSI-IM resource, aperiodic SRS transmission) which are indicated by DCI indications. The overriding of 'Unknown' symbols by the SFI means that UE 102 may have to assume the symbols as either 'DL', 'UL', or 'Reserved' according to SFI indications. If the UE 102 assumes aperiodic CSI-RS transmission and/or aperiodic CSI-IM resource, the UE 102 may perform CSI and/or RRM measurement based on the aperiodic CSI-RS transmission and/or aperiodic CSI-IM resource. If the UE 102 does not assume aperiodic CSI-RS transmission and/or aperiodic CSI-IM resource, the UE 102 may not use the aperiodic CSI-RS transmission and/or aperiodic CSI-IM resource for CSI and/or RRM measurement.

If the serving cell is TDD cell and is DL only cell (a serving cell with downlink component carrier but without uplink component carrier), UE 102 may interpret 'UL' indicated by SFI as 'Unknown'. Alternatively, if the serving cell is TDD cell and is DL only cell, UE 102 may interpret 'UL' indicated by SFI as 'Reserved. If the serving cell is TDD cell and is UL only cell (a serving cell without downlink component carrier but with uplink component carrier), UE 102 may interpret 'DL' indicated by SFI as 'Unknown'. Alternatively, if the serving cell is TDD cell and is UL only cell, UE 102 may interpret 'DL' indicated by SFI as 'Reserved.

If the UE 102 detects PDCCH which indicate time domain resource allocation for the scheduled PDSCH includes 'Unknown' symbol(s), the UE 102 may assume the PDSCH is mapped on the 'Unknown' symbol(s). In this case, there are several options to handle the other DL transmission (e.g. aperiodic CSI-RS transmission, aperiodic CSI-IM resource) on the 'Unknown' symbol(s). The first option is that the UE 102 does not assume any other DL transmissions on the 'Unknown' symbol(s) except for the scheduled PDSCH. The second option is that the UE 102 assumes the other DL transmissions on the 'Unknown' symbol(s) within the resources which are allocated for the scheduled PDSCH. The UE 102 does not assume any other DL transmissions on the 'Unknown' symbol(s) outside the resources which are allocated for the scheduled PDSCH. The third option is that the UE 102 assumes the other DL transmissions on the 'Unknown' symbol(s) irrespective of resource allocation for the PDSCH. In other words, the 'Unknown' symbol(s) is interpreted as 'DL'.

The UE 102 may have to monitor PDCCH on some 'Unknown' symbols. There may be several options to monitor PDCCH. If all of the OFDM symbols which are assigned for a given control resource set (CORESET) are 'DL', the UE 102 may assume all of the OFDM symbols are valid for monitoring of a PDCCH associated with the given CORESET. In this case, the UE 102 may assume each PDCCH candidate in the CORESET is mapped to all of the OFDM symbols for time-first RE group (REG)-to-control channel element (CCE) mapping. If all of the OFDM symbols which are assigned for a given CORESET are 'Unknown', the UE 102 may assume all of the OFDM symbols are valid for monitoring of a PDCCH associated with the given CORESET. In this case, the UE 102 may assume each PDCCH candidate in the CORESET is mapped to all of the OFDM symbols for time-first REG-to-CCE mapping.

If every OFDM symbols which is assigned for a given CORESET is either 'UL' or 'Reserved', the UE 102 may assume those OFDM symbols are not valid for monitoring of a PDCCH associated with the given CORESET. If some of the OFDM symbols which are assigned for a given CORESET are 'DL' and the others are 'UL' or 'Reserved' or if some of the OFDM symbols which are assigned for a given CORESET are 'Unknown' and the others are 'UL' or 'Reserved', the UE 102 may assume only the 'DL' or 'Unknown' OFDM symbols are valid for monitoring of a PDCCH associated with the given CORESET. In this case, the UE 102 may assume each PDCCH candidate in the CORESET duration is mapped to all of the 'DL' OFDM symbols but not to 'UL' or 'Reserved' symbols. In other words, the UE 102 may assume a shortened CORESET duration than the CORESET duration which is configured by higher layer.

If some of the OFDM symbols which are assigned for a given CORESET are 'DL' and the others are 'Unknown', the UE 102 may assume all of the 'DL'/'Unknown' OFDM symbols are valid for monitoring of a PDCCH associated with the given CORESET. In this case, the UE 102 may assume each PDCCH candidate in the CORESET duration is mapped to all of the 'DL'/'Unknown' OFDM symbols, and a single PDCCH candidate may be allowed to be mapped across 'DL' and 'Unknown' OFDM symbols. Alternatively, if some of the OFDM symbols which are assigned for a given CORESET are 'DL' and the others are 'Unknown', the UE 102 may assume only the 'DL' OFDM symbols are valid for monitoring of a PDCCH associated with the given CORESET. In this case, the UE 102 may assume each PDCCH candidate in the CORESET duration is mapped to only the 'DL' OFDM symbols but not to 'Unknown' symbols. In other words, the UE 102 may not assume that a single PDCCH candidate is mapped across 'DL' and 'Unknown' OFDM symbols. Yet alternatively, which assumption the UE 102 follows may be set per CORESET. Alternatively and/or additionally, if 'DL' symbols are separated into more than one symbol sets by 'Unknown' within a given CORESET, the UE 102 may assume only the first (i.e. the earliest) 'DL' OFDM symbol set is valid for monitoring of a PDCCH associated with the given CORESET.

Figure 12:
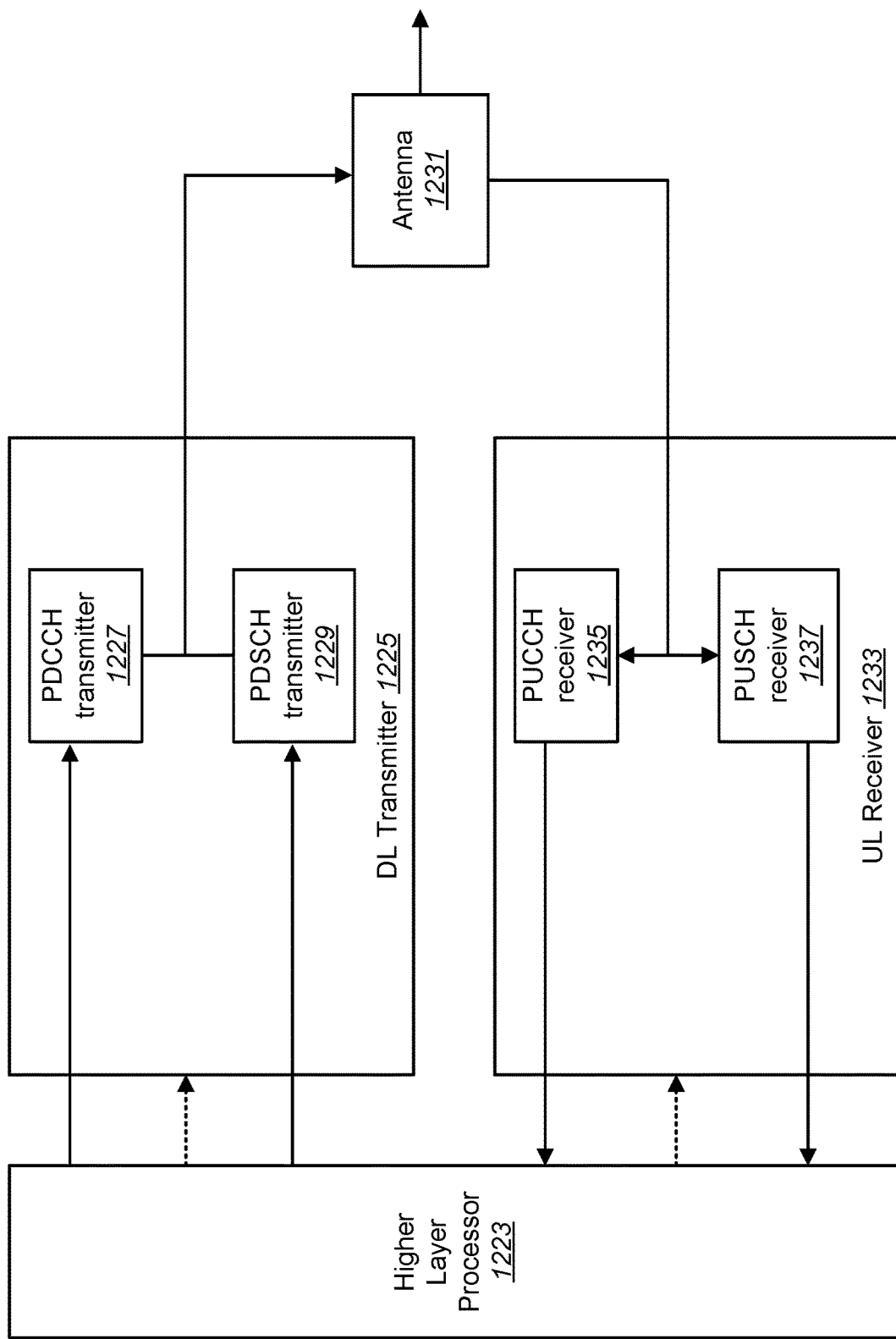
FIG. 12 is a block diagram illustrating one implementation of a gNB.

FIG. 12 is a block diagram illustrating one implementation of a gNB 1260. The gNB 1260 may include a higher layer processor 1223, a DL transmitter 1225, a UL receiver 1233, and antennas 1231. The DL transmitter 1225 may include a PDCCH transmitter 1227 and a PDSCH transmitter 1229. The UL receiver 1233 may include a PUCCH 1235 receiver and a PUSCH receiver 1237. The higher layer processor 1223 may manage physical layer's behaviors (the DL transmitter's and the UL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PDSCH transmitter 1229 transport blocks and provide the PDCCH transmitter 1227 transmission parameters related to the transport blocks. The UL receiver 1233 may receive multiplexed uplink physical channels and uplink physical signals via receiving antennas 1231 and de-multiplex them. The PUCCH receiver 1235 may provide the higher layer processor UCI. The PUSCH receiver 1237 may provide the higher layer processor received transport blocks.

Figure 13:
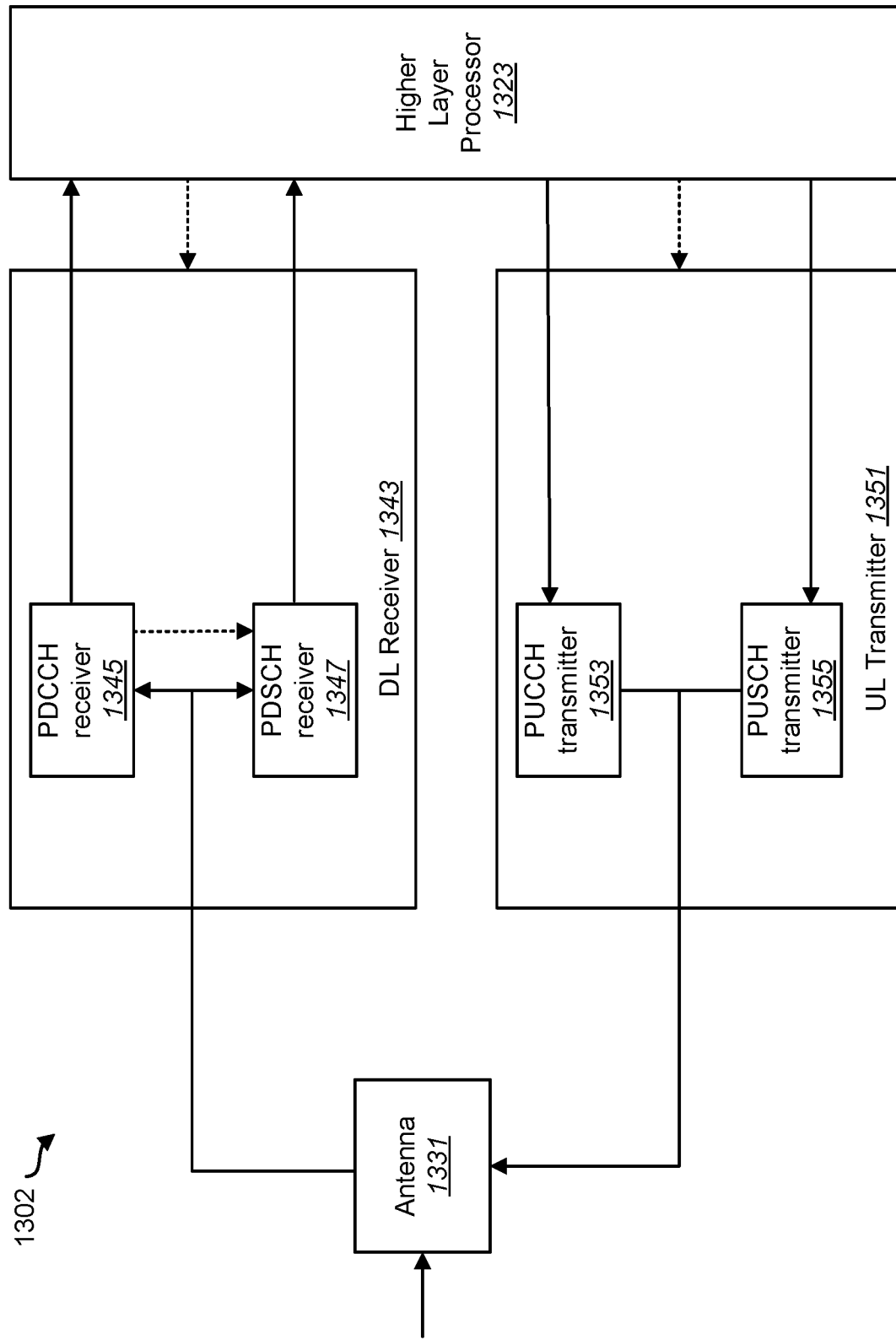
FIG. 13 is a block diagram illustrating one implementation of a UE.

FIG. 13 is a block diagram illustrating one implementation of a UE 1302. The UE 1302 may include a higher layer processor 1323, a UL transmitter 1351, a DL receiver 1343, and antennas 1331. The UL transmitter 1351 may include a PUCCH transmitter 1353 and a PUSCH transmitter 1355. The DL receiver 1343 may include a PDCCH receiver 1345 and a PDSCH receiver 1347. The higher layer processor 1323 may manage physical layer's behaviors (the UL transmitter's and the DL receiver's behaviors) and provide higher layer parameters to the physical layer. The higher layer processor 1323 may obtain transport blocks from the physical layer. The higher layer processor 1323 may send/acquire higher layer messages such as an RRC message and MAC message to/from a UE's higher layer. The higher layer processor 1323 may provide the PUSCH transmitter 1355 transport blocks and provide the PUCCH transmitter 1353 UCI. The DL receiver 1343 may receive multiplexed downlink physical channels and downlink physical signals via receiving antennas 1331 and de-multiplex them. The PDCCH receiver 1345 may provide the higher layer processor 1323 DCI. The PDSCH receiver 1347 may provide the higher layer processor 1323 received transport blocks.

For downlink data transmission, the UE 102 may attempt blind decoding of one or more PDCCH (also referred to just as control channel) candidates. This procedure is also referred to as monitoring of PDCCH. The PDCCH may carry DCI format which schedules PDSCH (also referred to just as shared channel or data channel). The gNB 160 may transmit PDCCH and the corresponding PDSCH in a downlink slot. Upon the detection of the PDCCH in a downlink slot, the UE 102 may receive the corresponding PDSCH in the downlink slot. Otherwise, the UE 102 may not perform PDSCH reception in the downlink slot.

Figure 14:
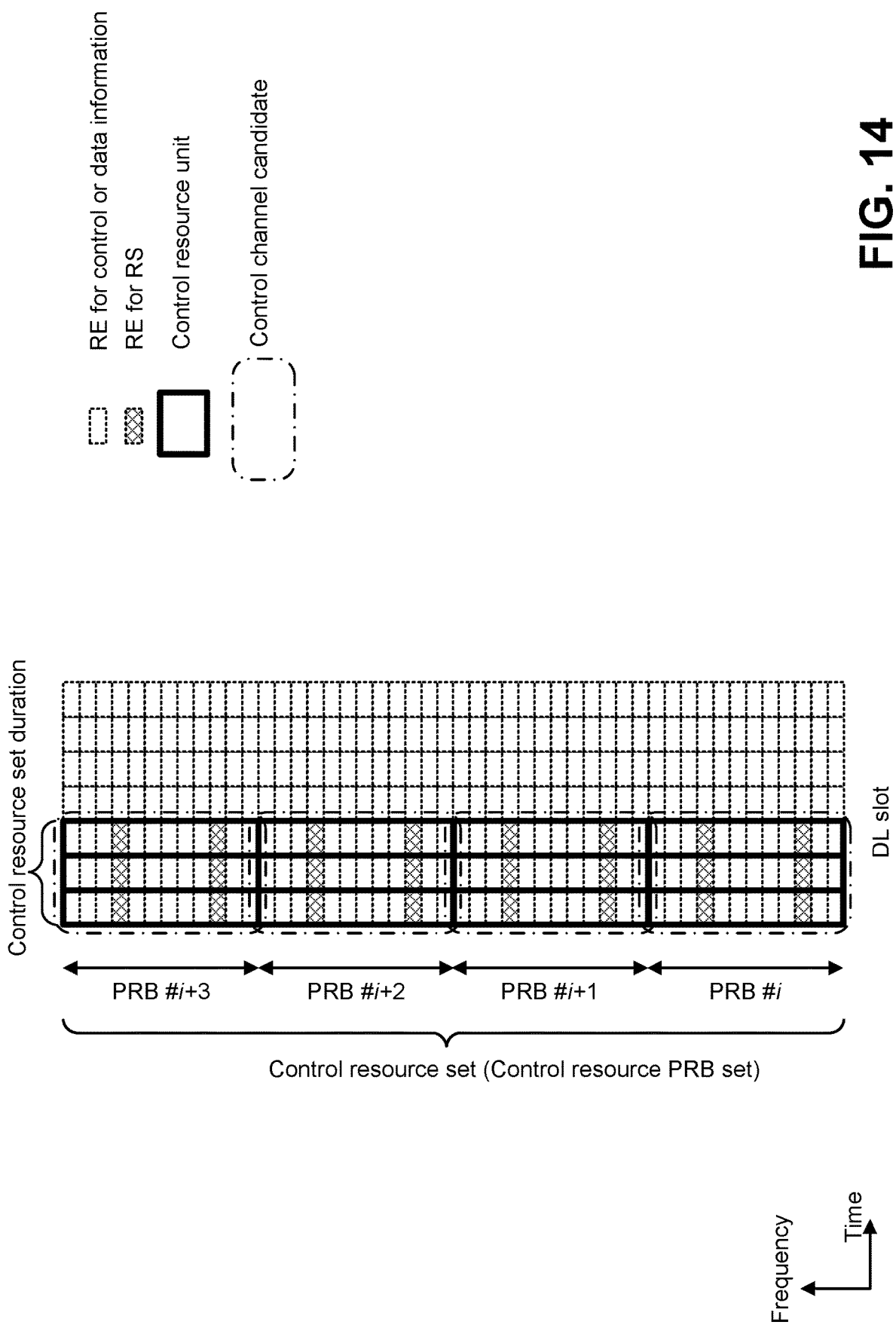
FIG. 14 illustrates an example of control resource unit and reference signal structure.

FIG. 14 illustrates an example of control resource unit and reference signal structure. A control resource set may be defined, in frequency domain, as a set of physical resource block(s) (PRBs). For example, a control resource set may include PRB#i to PRB#i+3 in frequency domain. The control resource set may also be defined, in time domain, as a set of OFDM symbol(s). It may also be referred to as a duration of the control resource set or just control resource set duration. For example, a control resource set may include three OFDM symbols, OFDM symbol#0 to OFDM symbol#2, in time domain. The UE 102 may monitor PDCCH in one or more control resource sets. The PRB set may be configured with respect to each control resource set through dedicated RRC signaling (e.g., via dedicated RRC reconfiguration). The control resource set duration may also be configured with respect to each control resource set through dedicated RRC signaling.

In the control resource unit and reference signal structure shown in FIG. 14, control resource units are defined as a set of resource elements (REs). Each control resource unit includes all REs (i.e., 12 REs) within a single OFDM symbol and within a single PRB (i.e., consecutive 12 subcarriers). REs on which reference signals (RSs) are mapped may be counted as those REs, but the REs for RSs are not available for PDCCH transmission and the PDCCH are not mapped on the REs for RSs.

Multiple control resource units may be used for a transmission of a single PDCCH. In other words, one PDCCH may be mapped the REs which are included in multiple control resource units. FIG. 14 shows the example that the UE 102 performing blind decoding of PDCCH candidates assuming that multiple control resource units located in the same frequency carries one PDCCH. However, RSs for the PDCCH demodulation may be contained in all of the resource units on which the PDCCH is mapped. The UE 102 may not be allowed to assume that the RSs contained in a given resource unit can be used for demodulation of a different resource unit. This may increase diversity gain for PDCCH transmission, since the gNB 160 may apply different precoders for different resource units. Alternatively, the UE 102 may be allowed to assume that the RSs contained in a given resource unit can be used for demodulation of a different resource unit within the same PRB. This may improve channel estimation accuracy, since the gNB 160 may apply the same precoders for more RSs within a PRB.

Figure 15:
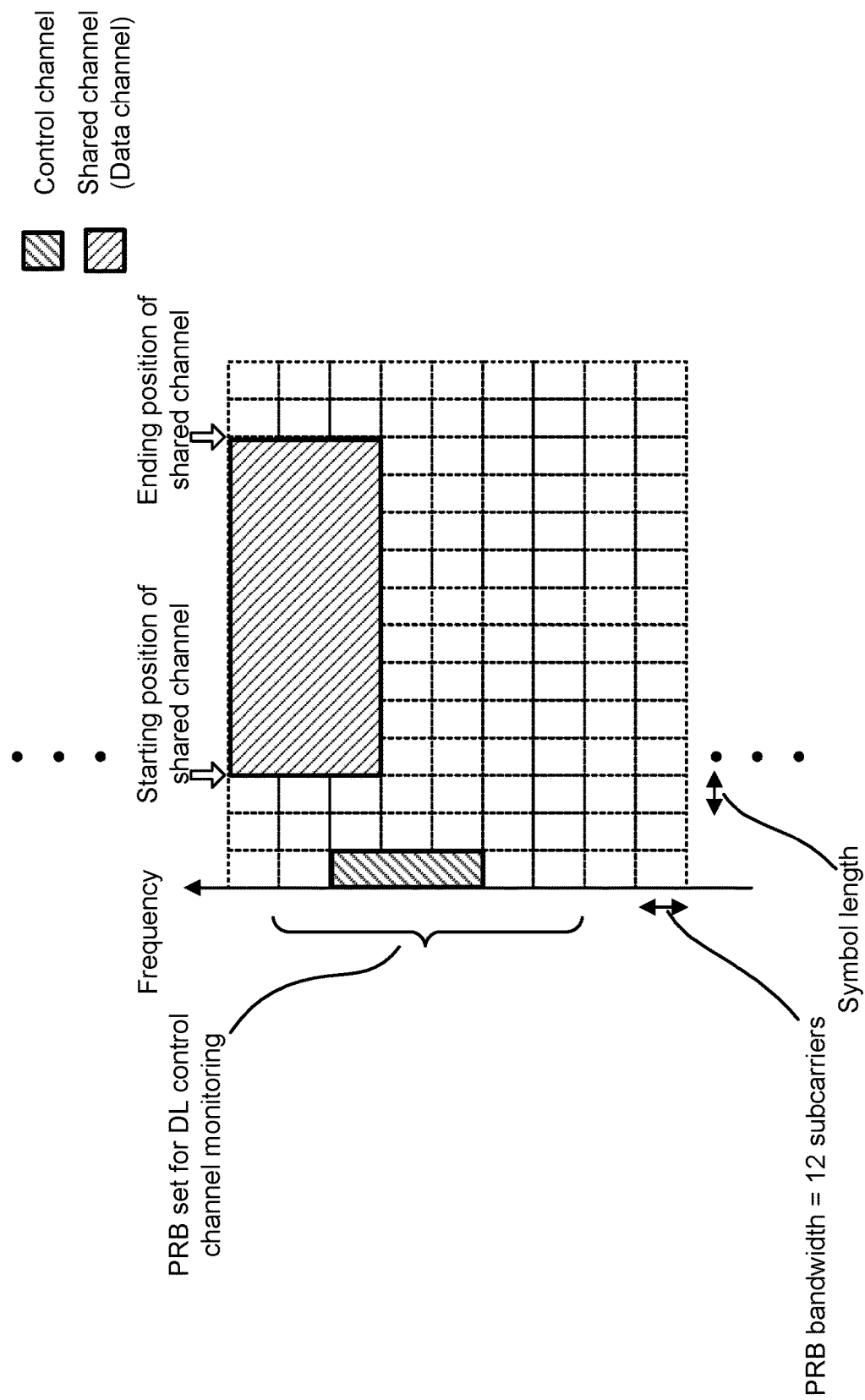
FIG. 15 illustrates an example of control channel and shared channel multiplexing.

FIG. 15 illustrates an example of control channel and shared channel multiplexing. The starting and/or ending position(s) of PDSCH may be indicated via the scheduling PDCCH. More specifically, the DCI format which schedule PDSCH may include information field(s) for indicating the starting and/or ending position(s) of the scheduled PDSCH.

The UE 102 may include a higher layer processor which is configured to acquire a dedicated RRC message. The dedicated RRC message may include information indicating a control resource set configuration. The UE 102 may also include PDCCH receiving circuitry which is configured to monitor a PDCCH based on the control resource set configuration. The PDCCH may carry DCI format which schedule a PDSCH. The UE 102 may also include PDSCH receiving circuitry which is configured to receive the PDSCH upon the detection of the corresponding PDCCH.

The gNB 160 may include a higher layer processor which is configured to send a dedicated RRC message. The dedicated RRC message may include information indicating a control resource set configuration. The gNB 160 may also include PDCCH transmitting circuitry which is configured to transmit a PDCCH based on the control resource set configuration. The PDCCH may carry DCI format which schedule a PDSCH. The gNB 160 may also include PDSCH transmitting circuitry which is configured to transmit the PDSCH upon the transmission of the corresponding PDCCH.

UE 102 may monitor PDCCH candidates in a control resource set. The set of PDCCH candidates may be also referred to as search space. The control resource set may be defined by a PRB set in frequency domain and a duration in units of OFDM symbol in time domain.

For each serving cell, higher layer signaling such as common RRC messages or UE dedicated RRC messages may configure the UE 102 with one or more PRB set(s) for PDCCH monitoring. For each serving cell, higher layer signaling such as common RRC messages or UE dedicated RRC messages may also configure the UE 102 with the control resource set duration for PDCCH monitoring.

Each control resource set may include a set of control channel elements (CCEs). Each CCE may be mapped to a set of resource element groups (REGs) which includes a plurality of REs. In the control resource set, a group-common PDCCH may be transmitted by the gNB 160. If the UE 102 is configured to monitor the group-common PDCCH by higher layer signaling, the UE 102 may monitor the group-common PDCCH. The group-common PDCCH may be a PDCCH with CRC scrambled by the certain RNTI, which may be fixed or be configured independently from C-RNTI. Alternatively, the group-common PDCCH may be a PDCCH with DCI format of which the RNTI field value is set to the certain RNTI.

In the control resource set, a UE-specific PDCCH may be transmitted by the gNB 160. The UE 102 may monitor the PDCCH. The UE-specific PDCCH may be a PDCCH with CRC scrambled by the C-RNTI of the UE 102. Alternatively, the UE-specific PDCCH may be a PDCCH with DCI format of which the RNTI field value is set to the C-RNTI of the UE 102. Monitoring of PDCCH may mean attempting to decode each of the PDCCH candidates in the set according to the monitored DCI formats. The UE 102 may monitor common search space within the control resource set. The UE 102 may also monitor UE-specific search space within the control resource set. The UE-specific PDCCH may be monitored in both the common and UE-specific search spaces while the group-common PDCCH may be monitored in only the common search space. The UE-specific PDCCH may schedules a PDSCH. The UE 102 may not be required to monitor the group-common PDCCH in the slot where the UE 102 would have a scheduled uplink transmission using at least the first OFDM symbol of the slot.

Upon detection of the UE-specific PDCCH, the UE 102 may receive the corresponding PDSCH. The DCI format of the UE-specific PDCCH may include one or more information field(s), for example, a field for indicating resource block assignment for the PDSCH, a field for indicating the starting position (the index of first OFDM symbol which carries the PDSCH) of the PDSCH, a field for indicating modulation order and transport block size for the PDSCH, etc. The group-common PDCCH, the UE-specific PDCCH and the PDSCH may be mapped to different RE sets so that they do not collide with one another.

For each serving cell, higher layer signalling configures a UE with P control resource sets. For control resource set p, 0<=p<P, the configuration includes: a first symbol index provided by higher layer parameter CORESET-start-symb; the number of consecutive symbols provided by higher layer parameter CORESET-time-duration; a set of resource blocks provided by higher layer parameter CORESET-freq-dom; a CCE-to-REG mapping provided by higher layer parameter CORESET-trans-type (also referred to as CORESET-CCE-to-REG-mapping); a REG bundle size, in case of interleaved CCE-to-REG mapping, provided by higher layer parameter CORESET-REG-bundle-size; and antenna port quasi-collocation provided by higher layer parameter CORESET-TCI-StateRefId. If the UE is not configured with higher layer parameter CORESET-TCI-StateRefId, the UE may assume that the DMRS antenna port associated with PDCCH reception in the USS and the DMRS antenna port associated with PBCH reception are quasi-collocated with respect to delay spread, Doppler spread, Doppler shift, average delay, and spatial Rx parameters.

For each serving cell and for each DCI format with CRC scrambled by C-RNTI, SPS-RNTI and/or grant-free RNTI that a UE is configured to monitor PDCCH, the UE is configured with associations to control resource sets. The associations may include associations to a set of control resource sets by higher layer parameter DCI-to-CORESET-map. For each control resource set in the set of control resource sets, the associations may include: the number of PDCCH candidates per CCE aggregation level L by higher layer parameter CORESET-candidates-DCI; a PDCCH monitoring periodicity of $k_p$ slots by higher layer parameter CORESET-monitor-period-DCI; a PDCCH monitoring offset of $o_p$ slots, where $0<=o_p<k_p$, by higher layer parameter CORESET-monitor-offset-DCI; and a PDCCH monitoring pattern within a slot, indicating first symbol(s) of the control resource set within a slot for PDCCH monitoring, by higher layer parameter CORESET-monitor-DCI-symbolPattern. The UE 102 may assume that non-slot based scheduling is configured in addition to slot-based scheduling, if the UE 102 is configured with higher layer parameter CORESET-monitor-DCI-symbolPattern. The UE 102 may assume that non-slot based scheduling is not configured but slot-based scheduling only, if the UE 102 is not configured with higher layer parameter CORESET-monitor-DCI-symbolPattern.

Figure 16:
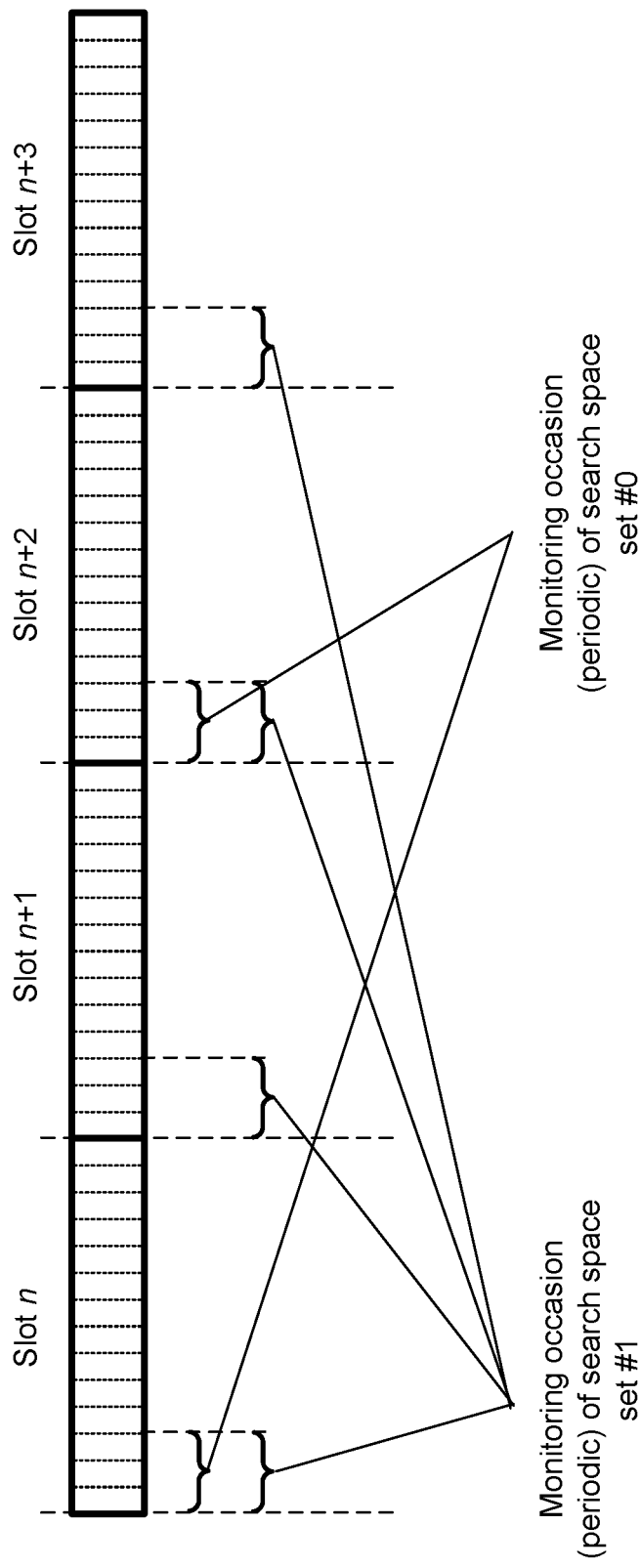
FIG. 16 illustrates PDCCH monitoring occasions for slot-based scheduling.

FIG. 16 illustrates PDCCH monitoring occasions for slot-based scheduling. A search space set may be identified for a combination of a control resource set, a DCI format (or DCI format group consisting of DCI format having a same DCI payload size). In the example shown in FIG. 16, two search space sets are seen, search space set #0 and #1. Both search space set #0 and #1 are associated with a same CORESET. The configuration of the CORESET such as CORESET-start-symb, CORESET-time-duration, CORESET-freq-dom, CORESET-trans-type, CORESET-REG-bundle-size, CORESET-TCI-StateRefId apply to both search space set #0 and #1. For example, CORESET-time-duration set to 3 symbols applies to both of them. Search space set #0 may be associated with a certain DCI format (e.g. DCI format 1, fallback DCI format), and search space set #1 may be associated with another certain DCI format (e.g. DCI format 2, regular DCI format). The higher layer parameter CORESET-monitor-period-DCI is set to 2 slots for search space set #0, while the higher layer parameter CORESET-monitor-period-DCI is set to 1 slot for search space set #1. Therefore, DCI format 1 may be potentially transmitted and/or monitored in every 2 slot, while DCI format 2 may be potentially transmitted and/or monitored in every slot.

Figure 17:
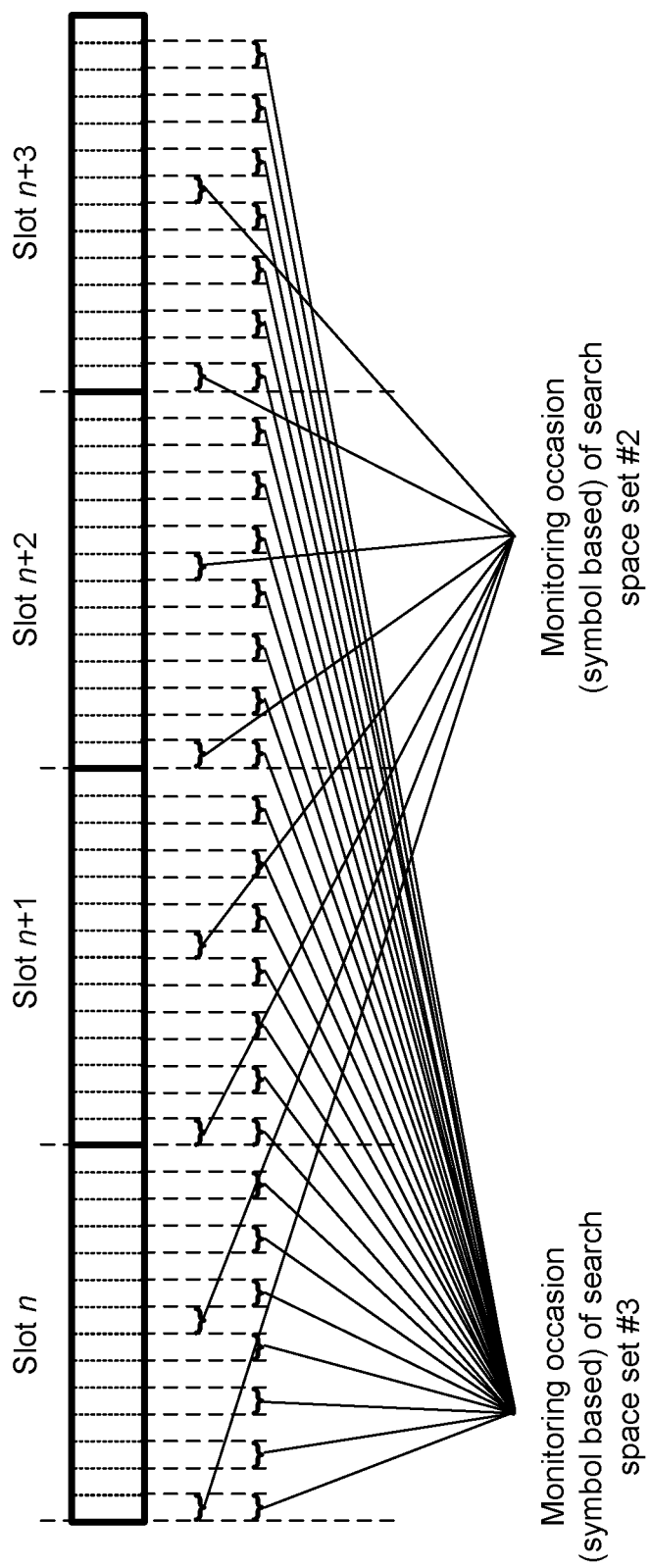
FIG. 17 illustrates PDCCH monitoring occasions for non-slot-based scheduling.

FIG. 17 illustrates PDCCH monitoring occasions for non-slot-based scheduling. In the example shown in FIG. 16, two search space sets are seen, search space set #2 and #3. Both search space set #2 and #3 are associated with a same CORESET. This CORESET may or may not be the same CORESET as in FIG. 16. The higher layer parameters CORESET-monitor-period-DCI for both search space set #2 and #3 are set to 1 slot.

In addition, the higher layer parameters CORESET-monitor-DCI-symbolPattern are individually configured to search space set #2 and #3. The higher layer parameter CORESET-monitor-DCI-symbolPattern may indicate, using a bitmap scheme, OFDM symbol(s) on which PDCCH is monitored. To be more specific, The higher layer parameter CORESET-monitor-DCI-symbolPattern per search space set may consist of 14 bits, the $1^{st}$ bit to $14^{th}$ bit which correspond to OFDM symbol #0 to #13, respectively. Each of the bits indicates whether or not PDCCH is monitored on the corresponding OFDM symbol (e.g. "0" indicates no PDCCH monitoring and "1" indicates PDCCH monitoring, or vice versa). In this example, the higher layer parameters CORESET-monitor-DCI-symbolPattern for search space set #2 indicates OFDM symbols #0 and #7 for PDCCH monitoring, which the higher layer parameters CORESET-monitor-DCI-symbolPattern for search space set #3 indicates OFDM symbols #0, #2, #4, #6, #8, #10, #12 for PDCCH monitoring. It is noted that these PDCCH monitoring applies to the slot that is specified by CORESET-monitor-period-DCI and CORESET-monitor-offset-DCI.

A control-channel element may consist of 6 resource-element groups (REGs) where a resource-element group equals one resource block during one OFDM symbol. Resource-element groups within a control-resource set may be numbered in increasing order in a time-first manner, starting with 0 for the first OFDM symbol and the lowest-numbered resource block in the control resource set. A UE can be configured with multiple control-resource sets. Each control-resource set may be associated with one CCE-to-REG mapping only. The CCE-to-REG mapping for a control-resource set can be interleaved or non-interleaved, configured by the higher-layer parameter CORESET-CCE-REG-mapping-type. The REG bundle size is configured by the higher-layer parameter CORESET-REG-bundle-size. For non-interleaved CCE-to-REG mapping, the REG bundle size is 6. For interleaved CCE-to-REG mapping, the REG bundle size is either 2 or 6 for a CORESET with CORESET-time-duration set to 1, and the REG bundle size is either $N^{CORESET}_{symb}$ or 6 for a CORESET with CORESET-time-duration $N^{CORESET}_{symb}$ set to greater than 1. The UE may assume: the same precoding in the frequency domain being used within a REG bundle if the higher-layer parameter CORESET-precoder-granularity equals CORESET-REG-bundle-size; and the same precoding in the frequency domain being used across within contiguous RBs in CORESET if the higher-layer parameter CORESET-precoder-granularity equals the number of contiguous RBs in the frequency domain within CORESET.

Some of the configuration per CORESET might not apply to search space set(s) for which the higher layer parameter CORESET-monitor-DCI-symbolPattern (e.g. symbol-wise bitmap) is configured. For example, even if the CORESET-time-duration is set to greater than 1 OFDM symbol, the UE 102 may assume each PDCCH monitoring occasion spans 1 OFDM symbol for the search space set(s) which is configured with CORESET-monitor-DCI-symbolPattern. The CORESET-time-duration set to greater than 1 OFDM symbol may be applicable to all and only the search space set(s) which is not configured with CORESET-monitor-DCI-symbolPattern. In this case, for interleaved CCE-to-REG mapping, the REG bundle size may be determined depending the CORESET-time-duration. Alternatively, for interleaved CCE-to-REG mapping, the REG bundle size may be determined assuming $N^{CORESET}_{symb}=1$.

Alternatively, the CORESET duration is always configured independently, and PDCCH monitoring occasion configured by using the symbol-wise bitmap may mean start of monitoring occasion if the CORESET duration is more than 1 OFDM symbol. For example, the CORESET-time-duration is set to 2 OFDM symbols and the third bit of the CORESET-monitor-DCI-symbolPattern is set to "1", the UE 102 may have to monitor PDCCH candidates which are mapped on the third and fourth OFDM symbols. In other words, each bit of the CORESET-monitor-DCI-symbolPattern set to "1" may indicate the starting symbol of one or more consecutive OFDM symbol(s) on which PDCCH candidate(s) are mapped.

With this alternative, if the CORESET duration is more than 1 OFDM symbol and at least if any of two adjacent bits of the CORESET-monitor-DCI-symbolPattern are set to "1", PDCCH monitoring occasions starting with OFDM symbols indicated by those two bits partially overlap. There are several ways to handle this overlapping. The first approach is that the UE 102 is not expected to be configured with the CORESET-monitor-DCI-symbolPattern which causes overlapping between adjacent PDCCH monitoring occasions for a same search space set. The second approach is that the PDCCH monitoring occasion overlapping is allowed and the UE 102 is not required to monitor PDCCH candidates being fully/partially mapped to the RE or REG that was already used by another detected PDCCH of another PDCCH monitoring occasion of the CORESET. The third approach is that the PDCCH monitoring occasion overlapping is allowed and the UE 102 is not required to monitor PDCCH candidates if the higher-layer parameter CORESET-precoder-granularity equals the number of contiguous RBs in the frequency domain within CORESET and if another PDCCH was detected in the other PDCCH monitoring occasion (i.e. overlapping PDCCH monitoring occasion) of the CORESET. Additionally and/or alternatively, if the higher-layer parameter CORESET-precoder-granularity equals the number of contiguous RBs in the frequency domain within CORESET and if a PDCCH was detected in a PDCCH monitoring occasion in the CORESET, the UE 102 may assume DMRS associated with the detected PDCCH is present in all REGs within the set of contiguous RBs of the CORESET where and when the detected PDCCH is mapped, and the UE 102 may not be expected to monitor PDCCH(s) in another PDCCH monitoring occasion overlapping the DMRS.

Each control resource set includes a set of CCEs numbered from 0 to $N_{CCE,p,k_p}-1$ where $N_{CCE,p,k_p}$ is the number of CCEs in control resource set p in monitoring period $k_p$. The sets of PDCCH candidates that a UE monitors are defined in terms of PDCCH UE-specific search spaces. A PDCCH UE-specific search space $S^{(L)}_{k_p}$ at CCE aggregation level L is defined by a set of PDCCH candidates for CCE aggregation level L. L can be one of 1, 2, 4, and 8.

For each serving cell, a UE 102 may have to set the slot configuration per slot over the number of slots to be equal to the slot configuration per slot over the number of slots as indicated by higher layer parameter Slot-assignmentSIB1 that may be a UE-common parameter (i.e. cell-specific parameter). If the UE is additionally provided UE-specific higher layer parameter Slot-assignment for the slot format per slot over the number of slots, the parameter Slot-assignment overrides only flexible symbols (also referred to as unknown symbols) per slot over the number of slots as provided by Slot-assignmentSIB1.

For each serving cell, for a set of symbols of a slot that are indicated as flexible (also referred to as unknown) by higher layer parameter Slot-assignmentSIB1 and, when provided, by higher layer parameter Slot-assignment, the UE 102 may follow the following assumptions. The UE 102 may have to receive PDCCH, PDSCH, or CSI-RS in the set of symbols of the slot if the UE 102 receives a corresponding indication by a DCI format with CRC scrambled by C-RNTI or a configuration by higher layers. The UE 102 may have to transmit PUSCH, PUCCH, PRACH, or SRS in the set of symbols of the slot if the UE receives a corresponding indication by a DCI format with CRC scrambled by C-RNTI or a configuration by higher layers. The UE 102 configured for reception of PDCCH or trigger type 0 CSI-RS (i.e. higher layer configured CSI-RS, also known as semi-statically configured periodic CSI-RS) in the set of symbols of the slot may have to receive the PDCCH or the trigger type 0 CSI-RS if the UE does not detect a DCI format with CRC scrambled by C-RNTI indicating to the UE 102 to transmit PUSCH, PUCCH, PRACH, or SRS in the set of symbols of the slot; otherwise, the UE 102 may not receive the PDCCH or the trigger type 0 CSI-RS in the set of symbols of the slot and may have to transmit PUSCH, PUCCH, PRACH, or SRS in the set of symbols of the slot. The UE 102 configured for transmission of trigger type 0 SRS (i.e. higher layer configured SRS, also known as semi-statically configured periodic SRS) or of PUCCH configured by higher layers in the set of symbols in the slot, may have to transmit trigger type 0 SRS or PUCCH configured by higher layers in the set of symbols of the slot if the UE does not detect a DCI format with CRC scrambled by C-RNTI that indicates to the UE to transmit PDSCH or CSI-RS in the set of symbols in the slot; otherwise, the UE may not transmit the trigger type 0 SRS or PUCCH in the set of symbols of the slot.

For a set of symbols of a slot that are indicated as uplink by higher layer parameter Slot-assignmentSIB1 or, when provided, by higher layer parameter Slot-assignment, the UE 102 may not be expected to be indicated by a DCI format with CRC scrambled by C-RNTI or be configured by higher layers to receive PDCCH, PDSCH, or CSI-RS in the set of symbols of the slot. For a set of symbols of a slot that are indicated as downlink by higher layer parameter Slot-assignmentSIB1 or, when provided, by higher layer parameter Slot-assignment, the UE 102 may not be expected to be indicated by a DCI format with CRC scrambled by C-RNTI or be configured by higher layers to transmit PUSCH, PUCCH, PRACH, or SRS in the set of symbols of the slot.

If a UE 102 is not configured by higher layers with parameter SFI-applicable-cells (i.e. if the UE 102 is configured with monitoring of DCI format STI of if the UE 102 is configured with any parameter related to monitoring of DCI format STI), the UE 102 may follow the above described procedure to determine the slot format for each slot. If a UE 102 is configured by higher layers with parameter SFI-applicable-cells, and for serving cell that the UE 102 is not configured with parameter SFI-applicable-cells, the UE 102 may follow the above described procedure to determine the slot format for each slot. If the UE 102 configured with monitoring a DCI format with CRC scrambled by SFI-RNTI for a serving cell and if the UE 102 does not detect the DCI format with CRC scrambled by SFI-RNTI which would indicate slot format for a given slot, the UE 102 may also follow the above described procedure to determine the slot format for that slot. Alternatively, if the UE 102 configured with monitoring a DCI format with CRC scrambled by SFI-RNTI for a serving cell and if the UE 102 does not detect the DCI format with CRC scrambled by SFI-RNTI which would indicate slot format for a given slot, the UE 102 may also follow the above described procedure to determine the slot format for that slot except for PDCCH reception, trigger type 0 CSI-RS reception, SPS PDSCH reception, trigger type 0 SRS transmission, PUCCH transmission, SPS/grant-free PUSCH transmission, or any combination of them.

If a UE 102 is configured by higher layers with parameter SFI-applicable-cells, the UE 102 is configured with a SFI-RNTI provided by higher layer parameter SFI-RNTI and with a set of serving cells by higher layer parameter SFI-monitoring-cells for monitoring PDCCH conveying a DCI format (e.g. a certain DCI format for SFI, also referred to as DCI format STI hereafter) with CRC scrambled by SFI-RNTI. Per serving cell in the set of serving cells, the UE is configured parameters including: control resource sets by higher layer parameter SFI-to-CORESET-map for monitoring PDCCH conveying DCI format SFI; a payload size of DCI format SFI by higher layer parameter SFI-DCI-payload-length; a set of cells for which DCI format SFI is applicable by higher layer parameter SFI-applicable-cells; a location of a field in DCI format SFI for a corresponding cell for each cell from the set of cells by higher layer parameter SFI-cell-to-SFI; the number of PDCCH candidates per CCE aggregation level for DCI format SFI by higher layer parameter SFI-Num-PDCCH-cand; a monitoring periodicity for PDCCH with DCI format SFI by higher layer parameter SFI-monitoring-periodicity.

If a UE 102 detects a DCI format with CRC scrambled by SFI-RNTI in slot $mT_{SFI}$ the slot configuration for slots $\{mT_{SFI}, mT_{SFI}+1, \ldots (m+1)T_{SFI}-1\}$ is given by the slot configuration indicated by the DCI format with CRC scrambled by SFI-RNTI, where $T_{SFI}$ is the value of the parameter SFI-monitoring-periodicity configured to a UE 102 by higher layers for a DCI format with CRC scrambled by SFI-RNTI.

For each serving cell that a UE 102 is configured by higher layers with the parameter SFI-applicable-cells, the UE 102 may assume some or all of the following (1) to (4).

(1) For a set of symbols of a slot, the UE 102 may not be expected to detect a DCI format with CRC scrambled by SFI-RNTI and indicating the set of symbols of the slot as uplink and to detect a DCI format with CRC scrambled by C-RNTI and indicating to the UE 102 to receive PDSCH or CSI-RS in the set of symbols of the slot.

(2) For a set of symbols of a slot, the UE 102 is not expected to detect a DCI format with CRC scrambled by SFI-RNTI and indicating the set of symbols in the slot as downlink and to detect a DCI format with CRC scrambled by C-RNTI and indicating to the UE 102 to transmit PUSCH, PUCCH, PRACH, or SRS in the set of symbols of the slot.

(3) For a set of symbols of a slot that are indicated as downlink/uplink by higher layer parameter Slot-assignmentSIB1 or, when provided, by higher layer parameter Slot-assignment, the UE 102 may not be expected to detect a DCI format with CRC scrambled by SFI-RNTI and indicating the set of symbols of the slot as uplink/downlink, respectively, or as flexible.

(4) For a set of symbols of a slot that are indicated as flexible by higher layer parameter Slot-assignmentSIB1 and, when provided, by higher layer parameter Slot-assignment, the UE 102 may follow all of or a part of the following procedures: if the UE 102 detects a DCI format with CRC scrambled by a SFI-RNTI and indicating the set of symbols of the slot as flexible and the UE 102 detects a DCI format with CRC scrambled by C-RNTI indicating to the UE to receive PDSCH or CSI-RS in the set of symbols of the slot, the UE 102 may follow the indication of the DCI format with CRC scrambled by C-RNTI; if the UE 102 detects a DCI format with CRC scrambled by a SFI-RNTI and indicating the set of symbols of the slot as flexible and the UE 102 detects a DCI format with CRC scrambled by C-RNTI indicating to the UE 102 to transmit PUSCH, PUCCH, PRACH, or SRS in the set of symbols of the slot the UE 102 may follow the indication of the DCI format with CRC scrambled by C-RNTI; if the UE 102 detects a DCI format with CRC scrambled by a SFI-RNTI and indicating the set of symbols of the slot as flexible and the set of symbols of the slot are also indicated as flexible by higher layer parameter Slot-assignmentSIB1 or, when provided, by higher layer parameter Slot-assignment, the UE 102 may consider the set of symbols as reserved; if the UE 102 is configured by higher layers reception of PDCCH or trigger type 0 CSI-RS or SPS PDSCH in the set of symbols of the slot, the UE 102 may have to receive PDCCH or trigger type 0 CSI-RS or SPS PDSCH in the set of symbols of the slot only if the UE detects a DCI format with CRC scrambled by SFI-RNTI that indicates the set of symbols of the slot as downlink; if the UE 102 is configured by higher layers transmission of trigger type 0 SRS or of PUCCH or of SPS/grant-free PUSCH in the set of symbols of the slot, the UE 102 may have to transmit trigger type 0 SRS or PUCCH or SPS/grant-free PUSCH in the set of symbols of the slot only if the UE 102 detects a DCI format with CRC scrambled by SFI-RNTI that indicates the set of symbols of the slot as uplink.

The fourth procedure of (4) can be replaced with that if the UE 102 is configured by higher layers reception of PDCCH, trigger type 0 CSI-RS, SPS PDSCH or some of them in the set of symbols of the slot, the UE 102 may have to receive PDCCH, trigger type 0 CSI-RS, SPS PDSCH or some of them in the set of symbols of the slot only either if the UE 102 detects a DCI format with CRC scrambled by SFI-RNTI that indicates the set of symbols of the slot as downlink or if the UE 102 detects a DCI format with CRC scrambled by C-RNTI/TC-RNTI/SPS-RNTI that schedules a PDSCH to be mapped on at least the set of symbols of the slot. With this option, even if the UE 102 detects a DCI format with CRC scrambled by SFI-RNTI that indicates the set of symbols of the slot as flexible, the UE 102 may have to receive PDCCH, trigger type 0 CSI-RS, SPS PDSCH or some of them in the set of symbols of the slot if the UE detects a DCI format with CRC scrambled by C-RNTI/TC-RNTI/SPS-RNTI that schedules a PDSCH to be mapped on the set of symbols of the slot. In other words, if the UE 102 detects a DCI format with CRC scrambled by SFI-RNTI that indicates the set of symbols of the slot as flexible or uplink, the UE 102 may not assume PDCCH, trigger type 0 CSI-RS, SPS PDSCH or some of them in the set of symbols of the slot unless the UE detects a DCI format with CRC scrambled by C-RNTI/TC-RNTI/SPS-RNTI that schedules a PDSCH to be mapped on the set of symbols of the slot. Moreover, if the UE 102 detects a DCI format with CRC scrambled by SFI-RNTI that indicates a subset of the set of symbols of the slot as downlink and if the UE 102 detects a DCI format with CRC scrambled by C-RNTI/TC-RNTI/SPS-RNTI that schedules a PDSCH to be mapped on at least the rest of the set, the UE 102 may have to receive PDCCH, trigger type 0 CSI-RS, SPS PDSCH or some of them in the set of symbols.

Similarly, the fifth procedure of (4) can be replaced with that if the UE 102 is configured by higher layers transmission of trigger type 0 SRS, PUCCH, SPS/grant-free PUSCH or some of them in the set of symbols of the slot, the UE 102 may have to transmit trigger type 0 SRS, PUCCH, SPS/grant-free PUSCH or some of them in the set of symbols of the slot only either if the UE detects a DCI format with CRC scrambled by SFI-RNTI that indicates the set of symbols of the slot as downlink or if the UE 102 detects a DCI format with CRC scrambled by C-RNTI/TC-RNTI/SPS-RNTI that schedules a PUSCH to be mapped on the set of symbols of the slot. With this option, even if the UE detects a DCI format with CRC scrambled by SFI-RNTI that indicates the set of symbols of the slot as flexible, the UE 102 may have to transmit trigger type 0 SRS, PUCCH, SPS/grant-free PUSCH or some of them in the set of symbols of the slot if the UE 102 detects a DCI format with CRC scrambled by C-RNTI/TC-RNTI/SPS-RNTI that schedules a PUSCH to be mapped on at least the set of symbols of the slot. In other words, if the UE 102 detects a DCI format with CRC scrambled by SFI-RNTI that indicates the set of symbols of the slot as flexible or downlink, the UE 102 may not assume trigger type 0 SRS, PUCCH, SPS/grant-free PUSCH or some of them in the set of symbols of the slot unless the UE detects a DCI format with CRC scrambled by C-RNTI/TC-RNTI/SPS-RNTI that schedules a PUSCH to be mapped on the set of symbols of the slot. Moreover, if the UE 102 detects a DCI format with CRC scrambled by SFI-RNTI that indicates a subset of the set of symbols of the slot as uplink and if the UE 102 detects a DCI format with CRC scrambled by C-RNTI/TC-RNTI/SPS-RNTI that schedules a PUSCH to be mapped on at least the rest of the set, the UE 102 may have to transmit trigger type 0 SRS, PUCCH, SPS/grant-free PUSCH or some of them in the set of symbols.

The fourth procedure of (4) can be replaced with that if the UE 102 is configured by higher layers reception of PDCCH, trigger type 0 CSI-RS, SPS PDSCH or some of them in the set of symbols of the slot, the UE 102 may have to receive PDCCH, trigger type 0 CSI-RS, SPS PDSCH or some of them in the set of symbols of the slot only either if the UE detects a DCI format with CRC scrambled by SFI-RNTI that indicates the set of symbols of the slot as downlink or if the UE does not detect any DCI format with CRC scrambled by SFI-RNTI indicating a slot format of the concerned slot.

Similarly, the fifth procedure of (4) can be replaced with that if the UE 102 is configured by higher layers transmission of trigger type 0 SRS, PUCCH, SPS/grant-free PUSCH or some of them in the set of symbols of the slot, the UE 102 may have to transmit trigger type 0 SRS, PUCCH, SPS/grant-free PUSCH or some of them in the set of symbols of the slot only either if the UE detects a DCI format with CRC scrambled by SFI-RNTI that indicates the set of symbols of the slot as downlink or if the UE does not detect any DCI format with CRC scrambled by SFI-RNTI indicating a slot format of the concerned slot.

The fourth procedure of (4) can be replaced with that if the UE 102 is configured by higher layers reception of PDCCH, trigger type 0 CSI-RS, SPS PDSCH or some of them in the set of symbols of the slot, the UE 102 may have to receive PDCCH, trigger type 0 CSI-RS, SPS PDSCH or some of them in the set of symbols of the slot only either if the UE detects a DCI format with CRC scrambled by SFI-RNTI that indicates the set of symbols of the slot as downlink or if the UE does not detect any DCI format with CRC scrambled by SFI-RNTI indicating a slot format of the concerned slot or if the UE detects a DCI format with CRC scrambled by C-RNTI/TC-RNTI/SPS-RNTI that schedules a PDSCH to be mapped on the set of symbols of the slot.

Similarly, the fifth procedure of (4) can be replaced with that if the UE 102 is configured by higher layers transmission of trigger type 0 SRS, PUCCH, SPS/grant-free PUSCH or some of them in the set of symbols of the slot, the UE 102 may have to transmit trigger type 0 SRS, PUCCH, SPS/grant-free PUSCH or some of them in the set of symbols of the slot only either if the UE detects a DCI format with CRC scrambled by SFI-RNTI that indicates the set of symbols of the slot as downlink or if the UE does not detect any DCI format with CRC scrambled by SFI-RNTI indicating a slot format of the concerned slot or if the UE 102 detects a DCI format with CRC scrambled by C-RNTI/TC-RNTI/SPS-RNTI that schedules a PUSCH to be mapped on the set of symbols of the slot.

A UE 102 is described. The UE 102 may comprise a higher layer processor configured to acquire a dedicated radio resource control (RRC) configuration including information for indicating whether or not slot format indicator (SFI) is applicable to a serving cell. The UE 102 may also comprise physical downlink control channel (PDCCH) receiving circuitry configured to monitor a first PDCCH scheduling a first physical downlink shared channel (PDSCH) in the serving cell, in a case that the dedicated RRC configuration including the information indicating that SFI is applicable to the serving cell is acquired, to monitor a second PDCCH carrying the SFI. The UE 102 may further comprise PDSCH receiving circuitry configured to receive the first PDSCH, upon a detection of the first PDCCH. If monitoring of the first PDCCH in a set of symbols is configured and if the second PDCCH of which the SFI indicates a subset of the set of symbols as downlink is detected, the first PDCCH may be monitored in the set of symbols if another first PDCCH scheduling a second PDSCH which is mapped to at least all the rest of the set of symbols is detected. If monitoring of the first PDCCH in a set of symbols is configured and if the second PDCCH of which the SFI indicates a subset of the set of symbols as downlink is detected, the first PDCCH may not be monitored in the set of symbols if any other first PDCCH scheduling a second PDSCH which is mapped to at least all the rest of the set of symbols is not detected.

A gNB 160 is described. The gNB 160 may comprise a higher layer processor configured to send a dedicated radio resource control (RRC) configuration including information for indicating whether or not slot format indicator (SFI) is applicable to a serving cell. The gNB 160 may also comprise physical downlink control channel (PDCCH) transmitting circuitry configured to transmit a first PDCCH scheduling a first physical downlink shared channel (PDSCH) in the serving cell and, in a case that the dedicated RRC including the information indicating that SFI is applicable to the serving cell is sent, to transmit a second PDCCH carrying the SFI. The UE 102 may further comprise PDSCH transmitting circuitry configured to transmit the first PDSCH, upon a transmission of the first PDCCH. If monitoring of the first PDCCH in a set of symbols is configured and if the second PDCCH of which the SFI indicates a subset of the set of symbols as downlink is detected, the first PDCCH may be monitored in the set of symbols if another first PDCCH scheduling a second PDSCH which is mapped to at least all the rest of the set of symbols is detected. If monitoring of the first PDCCH in a set of symbols is configured and if the second PDCCH of which the SFI indicates a subset of the set of symbols as downlink is detected, the first PDCCH may not be monitored in the set of symbols if any other first PDCCH scheduling a second PDSCH which is mapped to at least all the rest of the set of symbols is not detected.

Figure 18:
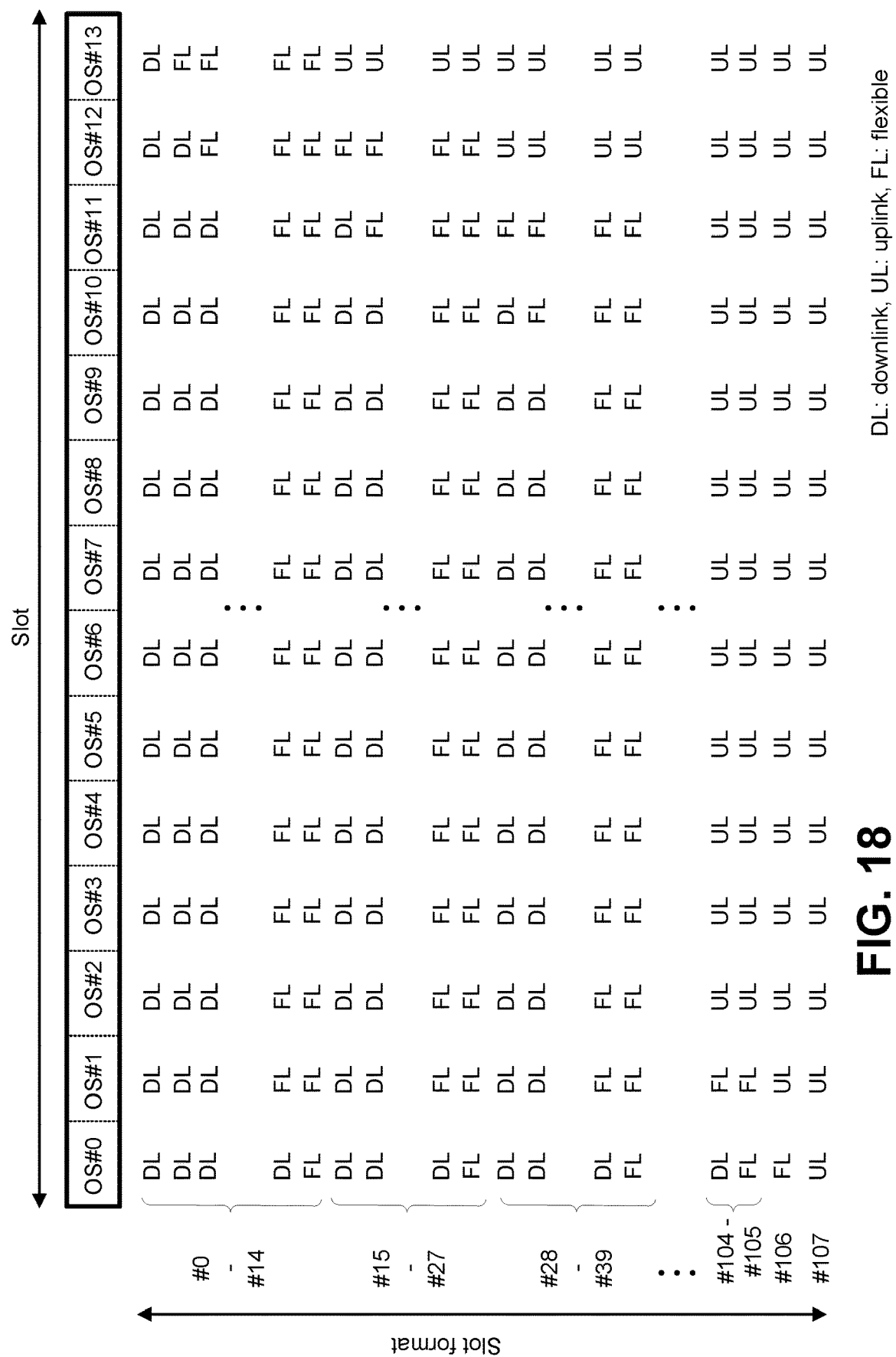
FIG. 18 illustrates an example of slot formats for a given slot.

FIG. 18 illustrates an example of slot formats for a given slot. Slot format #0 may specify that all symbols in the slot are DL symbols. Slot formats #1 to #13 may specify that the slot is filled from the earliest symbol by up to 13 DL symbol(s) followed by flexible symbol(s). Slot format #14 may specify that all symbols in the slot are flexible symbols. Slot formats #15 to #104 may specify that the slot is filled from the earliest symbol up to 12 DL symbol(s) followed by flexible symbol(s) further followed by UL symbol(s). Slot formats #105 to #106 may specify that the slot is filled from the earliest symbol up to 2 flexible symbol(s) followed by UL symbol(s). Slot format #107 may specify that all symbols in the slot are UL symbols. The UE-specific parameter Slot-assignment may be able to be set with any of these indices. On the other hand, the UE-common parameter Slot-assignmentSIB1 and SFI field indicated by the DCI format with CRC scrambled by SFI-RNTI may not be able to be set with every index. The UE-common parameter Slot-assignmentSIB1 may be set with one of a predefined subset (e.g. the subset including 8 slot format indices) of these indices. The SFI field indicated by the DCI format with CRC scrambled by SFI-RNTI may be set with one of a higher-layer configured subset (e.g. the subset including 8 slot format indices) of these indices.

Timing between DL assignment and corresponding DL data transmission may be indicated by a field in the DCI from a set of values, timing between UL assignment and corresponding UL data transmission may be indicated by a field in the DCI from a set of values, and timing between DL data reception and corresponding acknowledgement may be indicated by a field in the DCI from a set of values. The sets of values may be configured by higher layer signaling. Default timing(s) may be pre-defined at least for the case where the timing(s) is (are) unknown to the UE 102.

Figure 19:
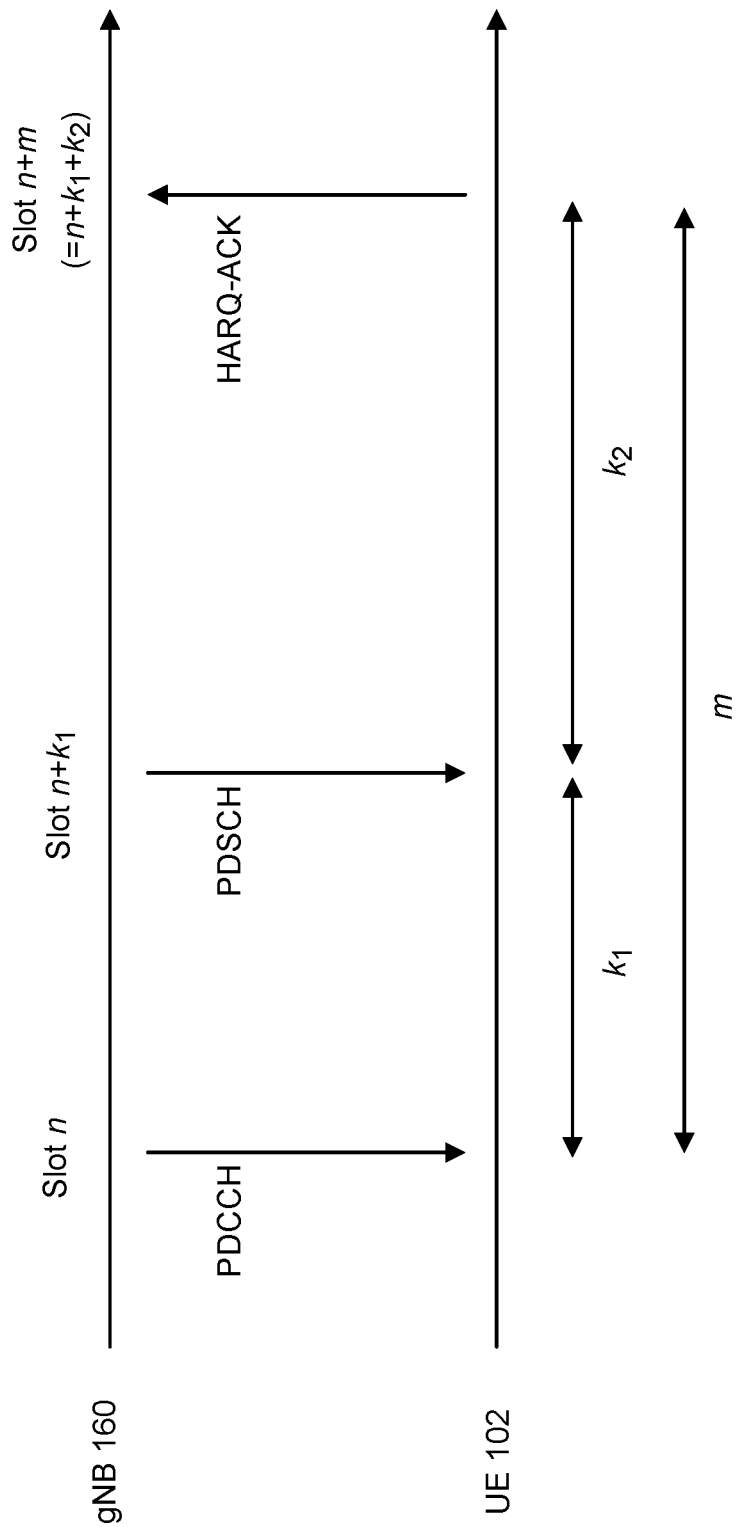
FIG. 19 illustrates an example of downlink scheduling and a Hybrid Automatic Repeat reQuest (HARQ) timeline.

FIG. 19 illustrates an example of a downlink scheduling and HARQ timeline. A PDCCH transmitted by the gNB 160 in slot n may carry DCI format which schedules a PDSCH, the DCI format including at least two fields, the first field may indicate $k_1$ and the second field may indicate $k_2$.

The UE 102 detecting the PDCCH in slot n may receive the scheduled PDSCH in slot $n+k_1$, and then in slot $n+k_1+k_2$ the UE 102 may report HARQ-ACK corresponding to the PDSCH. Alternatively, the second field may indicate m, and the UE 102 may report the HARQ-ACK in slot n+m. In other words, upon the detection of the corresponding PDCCH in slot $i-k_1$, the UE 102 may receive a PDSCH in slot i, and the UE 102 may transmit the HARQ-ACK in slot j for the PDSCH transmission in slot $j-k_2$. Alternatively, the UE 102 may transmit the HARQ-ACK in slot j for the PDSCH transmission scheduled by the corresponding PDCCH in slot j−m.

Figure 20:
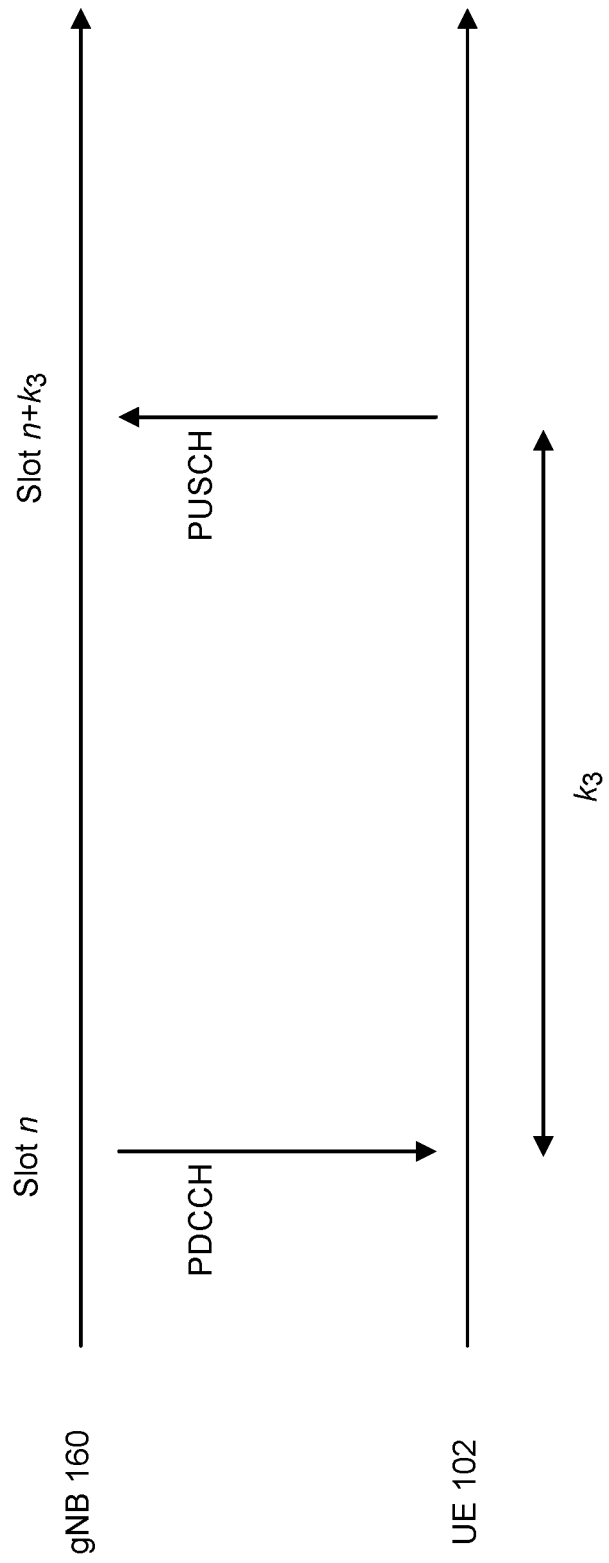
FIG. 20 illustrates an example of uplink scheduling timeline.
Figure 21:
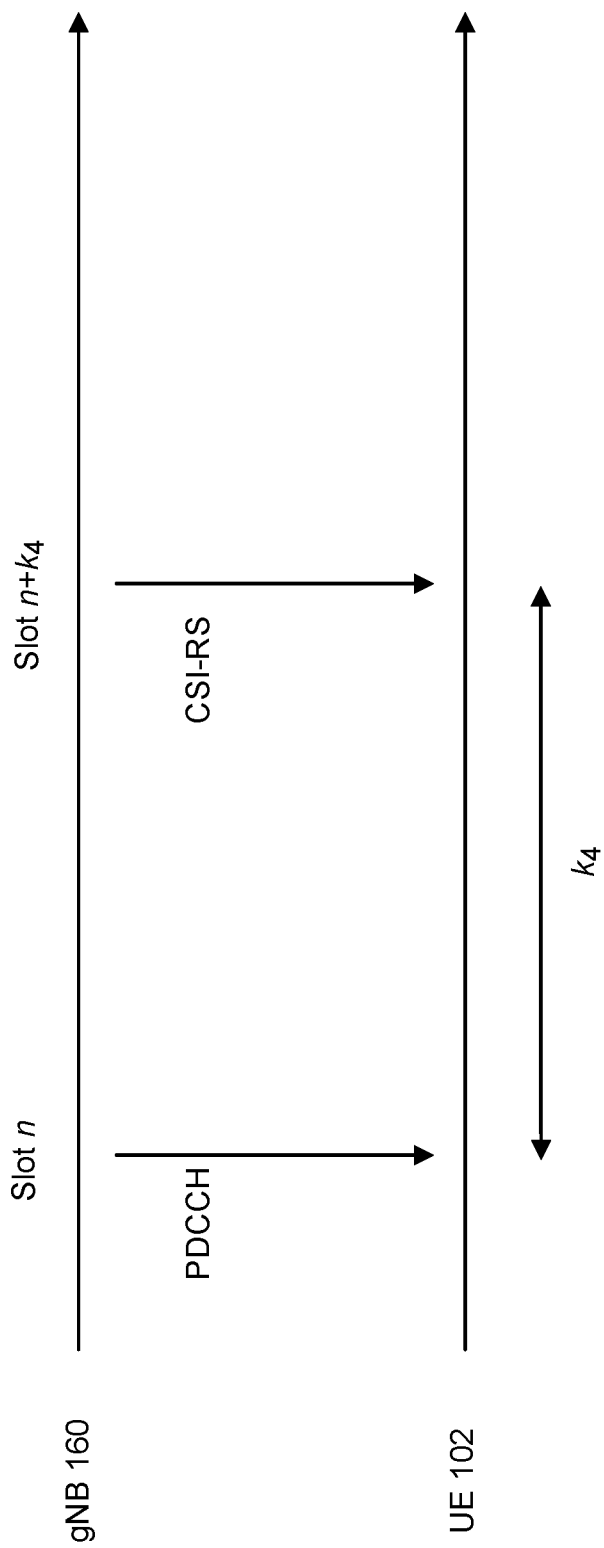
FIG. 21 illustrates an example of downlink aperiodic Channel State information-reference signal (CSI-RS) transmission timeline.

FIG. 20 illustrates an example of an uplink scheduling timeline. A PDCCH transmitted by the gNB 160 in slot n may carry DCI format which schedules a PUSCH, the DCI format including at least a field which may indicate $k_3$. The UE 102 detecting the PDCCH in slot n may transmit the scheduled PUSCH in slot $n+k_3$. In other words, upon the detection of the corresponding PDCCH in slot $i-k_3$, the UE 102 may transmit a PUSCH in slot i, FIG. 21 illustrates an example of a downlink aperiodic CSI-RS transmission timeline. A PDCCH transmitted by the gNB 160 in slot n may carry DCI format which indicates presence of aperiodic CSI-RS, the DCI format including at least a field which may indicate $k_4$. The UE 102 detecting the PDCCH in slot n may assume presence of aperiodic CSI-RS in slot $n+k_4$ for CSI measurement and/or Radio Resource Management (RRM) measurement.

Figure 22:
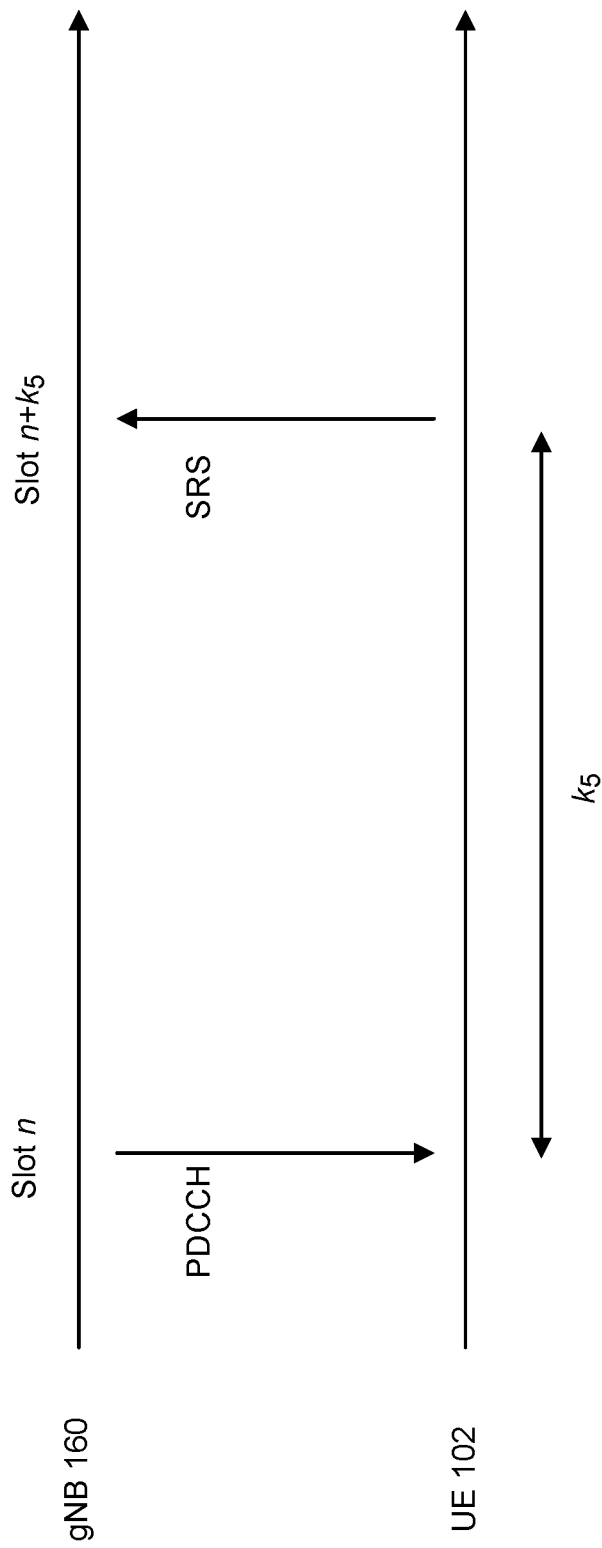
FIG. 22 illustrates an example of uplink aperiodic Sounding Reference Signals (SRS) transmission timeline.

FIG. 22 illustrates an example of an uplink aperiodic SRS transmission timeline. A PDCCH transmitted by the gNB 160 in slot n may carry DCI format which schedules an aperiodic SRS, the DCI format including at least a field which may indicate $k_5$. The UE 102 detecting the PDCCH in slot n may transmit the scheduled aperiodic SRS in slot $n+k_5$. In other words, upon the detection of the corresponding PDCCH in slot $i-k_5$, the UE 102 may transmit aperiodic SRS in slot i, The presence/disabling of each of above-described fields may be configured by higher layer signaling. The configurations of presence/disabling may be common among those fields. Alternatively, the presence/disabling may be separately configurable. If at least one of the fields is not present or is disabled, a default value (e.g., a predefined fixed value or a value included in system information) may be used, instead. For example, a default value for $k_1$ may be 0, and a default value for $k_2$ or $k_3$ may be 4.

If the field is present, the UE 102 may be configured with multiple values (e.g., the first value to the fourth value) by higher layer signaling. Each of the possible values for the field (e.g., 2-bit field) may correspond to a different value among the configured values. The UE 102 may use, as a k value, the value which corresponds to the field value set in the associated field in the detected PDCCH.

The UE 102 may be configured with multiple values (e.g., the first value to the third value) by higher layer signaling. At least one possible value for the field (e.g., 2-bit field) may correspond to a predefined fixed value. Each of the rest of possible values for the field (e.g., 2-bit field) may correspond to a different value among the configured values.

The UE 102 may use, as a k value, the value which corresponds to the field value set in the associated field in the detected PDCCH. In this case, without configurability of the presence of the field, the gNB 160 can use the predefined fixed value so that the gNB 160 and the UE 102 share the same k value even during RRC (re)configuration for those higher-layer configured values. The predefined fixed value may depend on timing offset type. For example, the value for $k_1$ may be 0, and the value for $k_2$ or $k_3$ may be 4. Alternatively, a value indicated though system information can be used, instead of the predefined fixed value.

PDSCH and/or PUSCH RE mapping may be affected by higher layer signaling and/or layer-1 signaling such as a PDCCH with a DCI format 1 and 2. For PDSCH, modulated complex-valued symbols may be mapped in REs which meet all of the following criteria: they are in the resource blocks assigned for transmission; they are declared as available for PDSCH according to rate matching resource set configuration and/or indication; they are not used for CSI-RS; they are not used for Phase Tracking RS (PT-RS); they are not reserved for SS/PBCH; they are not declared as 'reserved'.

To decode PDSCH according to a detected PDCCH, a UE may be configured with any of higher layer parameters: rate-match-PDSCH-resource-set consisting of one or multiple reserved pairs of RBs (higher layer parameter rate-match-PDSCH-resource-RBs which is also referred to as bitmap-1) and reserved symbols (higher layer parameters rate-match-PDSCH-resource-symbols which is also referred to as bitmap-2) for which the reserved RBs apply; rate-match-resources-v-shift consisting of LTE-CRS-vshift(s); rate-match-resources-antenna-port consisting of LTE-CRS antenna ports 1, 2 or 4 ports; rate-match-CORESET consisting of CORESET-ID(s) of CORESET configured to a UE 102 for monitoring. The UE 102 may have to determine the provided PDSCH RE mapping according to the union of provided rate-matching configurations. To decode PDSCH a UE 102 rate-matches around the REs corresponding to detected PDCCH that scheduled the PDSCH. A UE 102 may not be expected to handle the case where PDSCH DMRS REs are over-lapping, even partially, with any RE(s) indicated by the rate-matching configuration rate-match-PDSCH-resource-set and rate-match-resources-v-shift and rate-match-resources-antenna-port and rate-match-CORESET.

More specifically, on the RB-symbol level, a UE 102 may be RRC configured with one or multiple pairs (e.g. up to 16 pairs) of bitmap-1 and bitmap-2, each pair determining a time-frequency resource set, i.e. kronecker(transpose(bitmap-1), bitmap-2). The bitmap-1 is of at least RB granularity (up to 275 bits, one bit corresponding to one RB). The bitmap-2 is of 14 symbols (e.g. always 14 bits for 1 slot) in time for which the bitmap-1 applies (one bit per symbol). In addition, on the RB-symbol level, for a rate-matching resource set(s), a UE 102 may be RRC configured with one bitmap-3 per each pair of bitmap-1 and bitmap-2. Each bit in bitmap-3 corresponds to a unit equal to a duration of the bitmap-2, and indicates whether the pair is present in the unit or not. The bitmap-3 may be composed of {1, 5, 10, 20 or 40 units} but is at most of 20 or 40 ms duration. If the bitmap-3 is configured, the UE 102 rate-matches around union of the resource sets where each resource is expressed by a set of bitmap-1, bitmap-2 and bitmap-3.

A layer-1 signaling may indicate resource sets for PDSCH rate matching. A DCI format scheduling PDSCH may include, if configured, an information field for indicating PDSCH rate matching resources which are linked to the configured resource sets. There are several options. The first option is that 1 bit turns a single resource set on or off. In this option, the information field carries N bit(s), and each bit corresponds to different resource set (i.e. different combination of bitmap-1 and bitmap-2). The second option is that 1 bit turns all resource sets on or off. In this option, the information field carries 1 bit. The third option is that N bit turns subsets of the resource sets on or off. In this option, the information field carries N bit(s), and each bit corresponds to different subset of the resource set (i.e. different subset out of all combinations of bitmap-1 and bitmap-2) For example, with this option, each entry of the $2^N$ entries expressed by the information field specifies on/off states of all configured resource sets. The presence of this bit field in DCI format is configured by higher layer signaling. Here, "on" may mean that a resource set is unavailable for PDSCH transmission and the PDSCH is rate matched around the resource set. Meanwhile, "off" may mean that a resource set is available for PDSCH transmission and the PDSCH is not rate matched around but mapped on the resource set. Or, vice versa.

Figure 23:
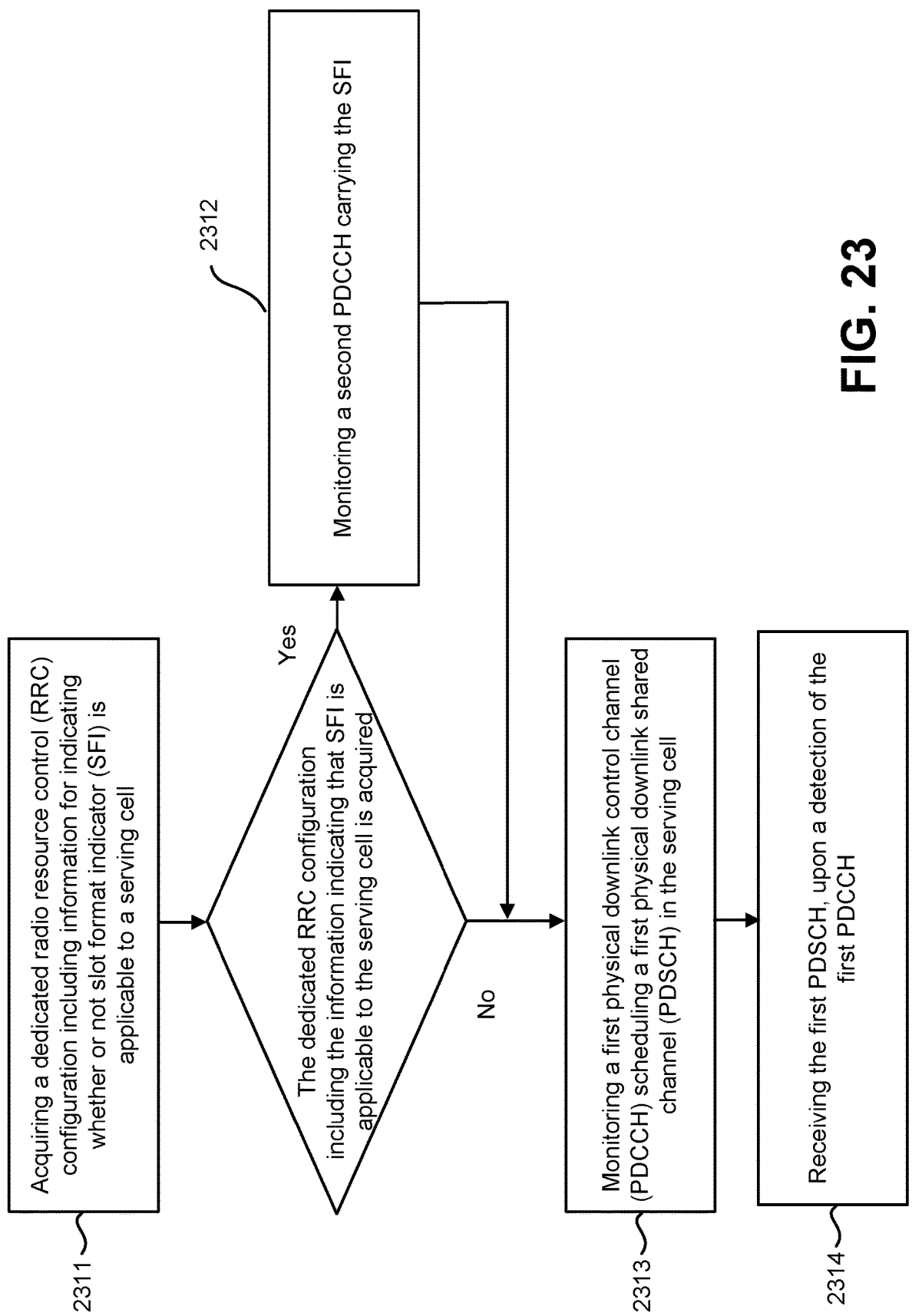
FIG. 23 illustrates a flow chart of a method for a UE.

FIG. 23 illustrates a flow chart of a method for a UE. A method for a UE 102 is described. The method may comprise acquiring 2311 a dedicated radio resource control (RRC) configuration including information for indicating whether or not slot format indicator (SFI) is applicable to a serving cell. The method may also comprise, in a case that the dedicated RRC configuration including the information indicating that SFI is applicable to the serving cell is acquired, monitoring 2312 a second PDCCH carrying the SFI. The method may also comprise monitoring 2313 a first PDCCH scheduling a first physical downlink shared channel (PDSCH) in the serving cell. The method may further comprise receiving 2314 the first PDSCH, upon a detection of the first PDCCH. If monitoring of the first PDCCH in a set of symbols is configured and if the second PDCCH of which the SFI indicates a subset of the set of symbols as downlink is detected, the first PDCCH may be monitored in the set of symbols if another first PDCCH scheduling a second PDSCH which is mapped to at least all the rest of the set of symbols is detected. If monitoring of the first PDCCH in a set of symbols is configured and if the second PDCCH of which the SFI indicates a subset of the set of symbols as downlink is detected, the first PDCCH may not be monitored in the set of symbols if any other first PDCCH scheduling a second PDSCH which is mapped to at least all the rest of the set of symbols is not detected.

Figure 24:
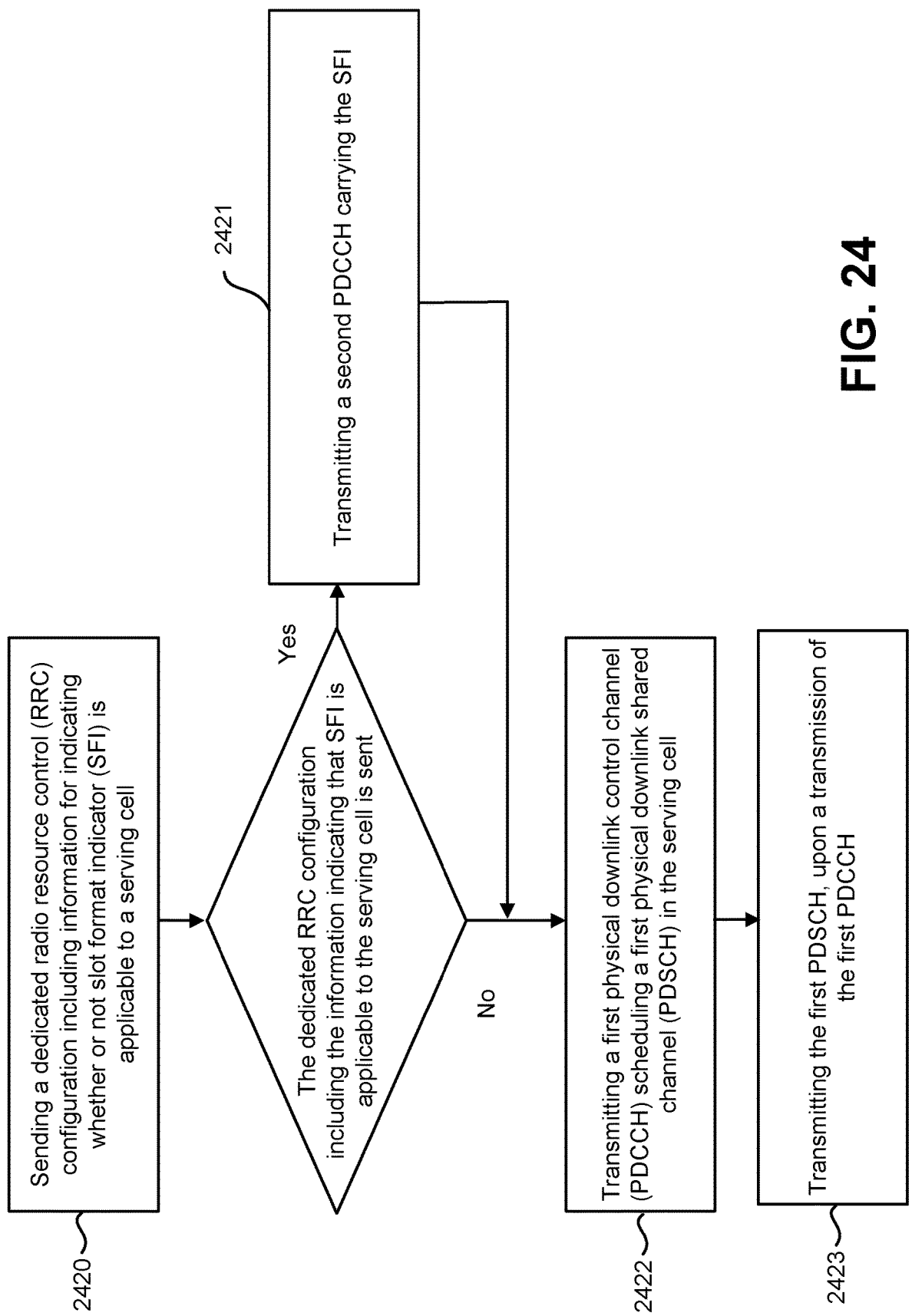
FIG. 24 illustrates a flow chart of a method for a gNB.

FIG. 24 illustrates a flow chart of a method for a gNB. A method for a gNB 160 is described. The method may comprise sending 2420 a dedicated radio resource control (RRC) configuration including information for indicating whether or not slot format indicator (SFI) is applicable to a serving cell. The method may also comprise in a case that the dedicated RRC including the information indicating that SFI is applicable to the serving cell is sent, transmitting 2421 a second PDCCH carrying the SFI. The method may also comprise transmitting 2422 a first PDCCH scheduling a first physical downlink shared channel (PDSCH) in the serving cell. The method may further comprise transmitting 2423 the first PDSCH, upon a transmission of the first PDCCH. If monitoring of the first PDCCH in a set of symbols is configured and if the second PDCCH of which the SFI indicates a subset of the set of symbols as downlink is detected, the first PDCCH may be monitored in the set of symbols if another first PDCCH scheduling a second PDSCH which is mapped to at least all the rest of the set of symbols is detected. If monitoring of the first PDCCH in a set of symbols is configured and if the second PDCCH of which the SFI indicates a subset of the set of symbols as downlink is detected, the first PDCCH may not be monitored in the set of symbols if any other first PDCCH scheduling a second PDSCH which is mapped to at least all the rest of the set of symbols is not detected.

Figure 25:
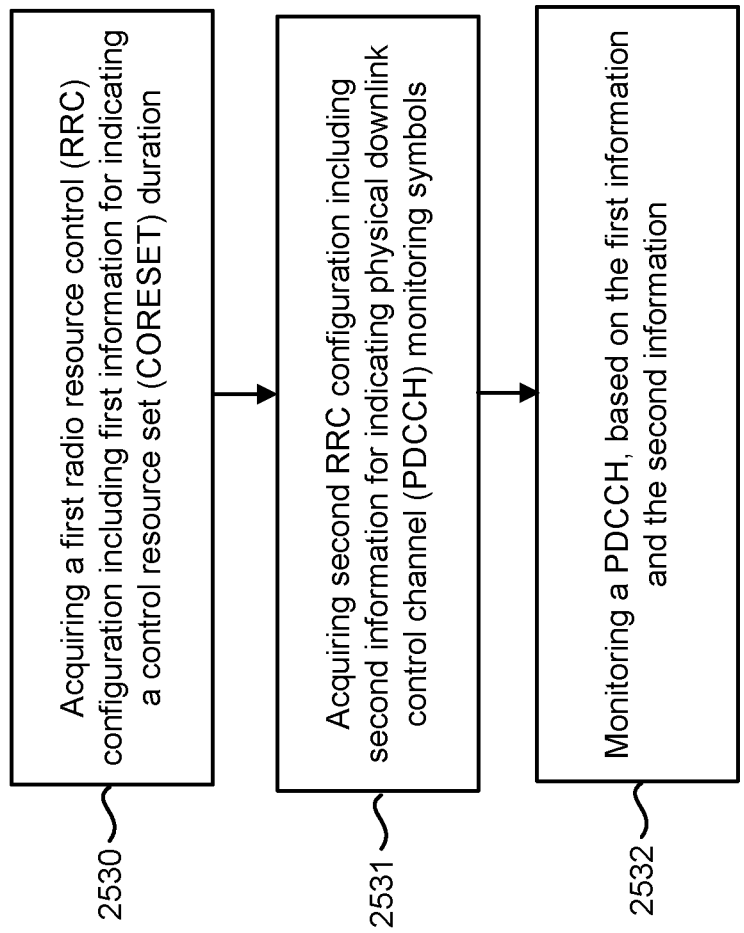
FIG. 25 illustrates a flow chart of a method for UE.

FIG. 25 illustrates a flow chart of a method for a UE. The method may comprise acquiring 2530 a first radio resource control (RRC) configuration including first information for indicating a control resource set (CORESET) duration. The method may also comprise acquiring 2531 second RRC configuration including second information for indicating physical downlink control channel (PDCCH) monitoring symbols. The method may also comprise 2532 monitoring a PDCCH, based on the first information and the second information. The CORESET duration may be set to a value larger than 1. The second information may be bitmap information. Each bit of the bitmap information may correspond to a respective OFDM symbol in a slot. The bit of which value is set to 1 may indicate a start of a PDCCH monitoring occasion. The bitmap information may be set such that any two adjacent PDCCH monitoring occasions do not overlap with each other.

Figure 26:
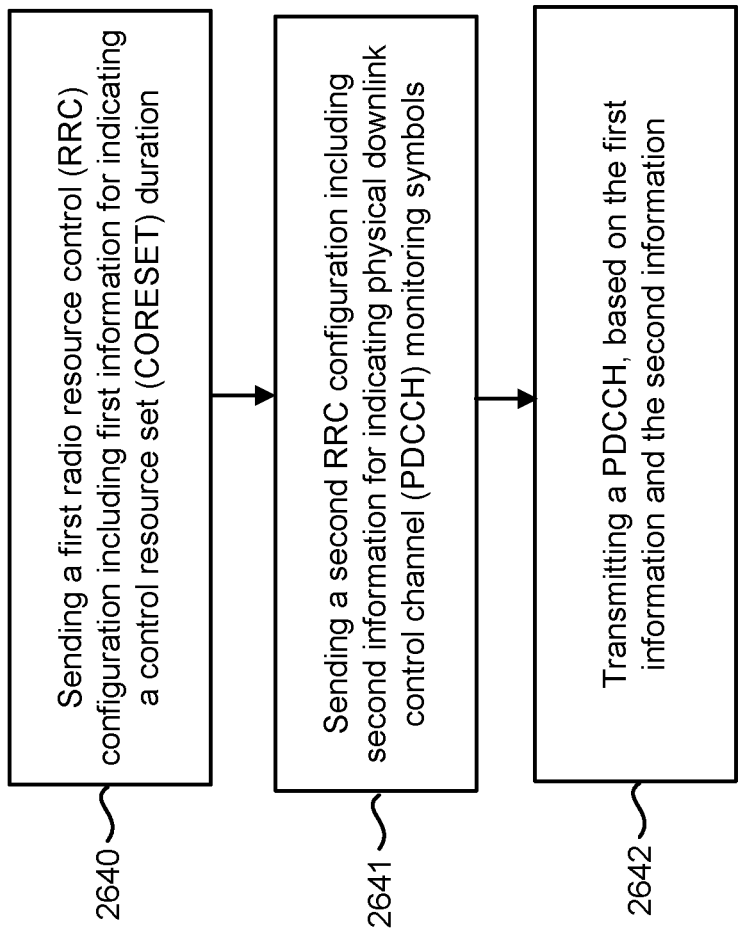
FIG. 26 illustrates a flow chart of a method for a base station.

FIG. 26 illustrates a flow chart of a method for a base station. The method may comprise sending 2640 a first radio resource control (RRC) configuration including first information for indicating a control resource set (CORESET) duration. The method may also comprise sending 2641 a second RRC configuration including second information for indicating physical downlink control channel (PDCCH) monitoring symbols. The method may also comprise transmitting 2642 a PDCCH, based on the first information and the second information. The CORESET duration may be set to a value larger than 1. The second information may be bitmap information. Each bit of the bitmap information may correspond to a respective OFDM symbol in a slot. The bit of which value is set to 1 may indicate a start of a PDCCH monitoring occasion. The bitmap information may be set such that any two adjacent PDCCH monitoring occasions do not overlap with each other.

It should be noted that various modifications are possible within the scope of the present invention defined by claims, and embodiments that are made by suitably combining technical means disclosed according to the different embodiments are also included in the technical scope of the present invention.

It should be noted that in most cases the UE 102 and the gNB. 160 may have to assume same procedures. For example, when the UE 102 follows a given procedure (e.g. the procedure described above), the gNB 160 may also have to assume that the UE 102 follows the procedure. Additionally, the gNB 160 may also have to perform the corresponding procedures. Similarly, when the gNB 160 follows a given procedure, the UE 102 may also have to assume that the gNB 160 follows the procedure. Additionally, the UE 102 may also have to perform the corresponding procedures. The physical signals and/or channels that the UE 102 receives may be transmitted by the gNB 160. The physical signals and/or channels that the UE 102 transmits may be received by the gNB 160. The higher-layer signals and/or channels (e.g. dedicated RRC configuration messages) that the UE 102 acquires may be sent by the gNB 160. The higher-layer signals and/or channels (e.g. dedicated RRC configuration messages) that the UE 102 sends may be acquired by the gNB 160.

It should be noted that names of physical channels and/or signals described herein are examples.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

The invention claimed is:

1. A user equipment (UE) comprising:
a higher layer processor configured to acquire a first radio resource control (RRC) configuration including first information for indicating a control resource set (CORESET) duration, and to acquire a second RRC configuration including second information for indicating physical downlink control channel (PDCCH) monitoring symbols, to acquire third information for indicating PDCCH monitoring periodicity k, and to acquire fourth information for indicating PDCCH monitoring offset o; and
receiving circuitry configured to monitor a PDCCH, based on the first information, the second information, the third information, and the fourth information;
wherein $0 \leq o < k$, the CORESET duration is set to a value larger than 1,
the second information expresses a PDCCH monitoring pattern within a slot and is bitmap information that includes 14 bits,
each bit of the bitmap information corresponds to a respective OFDM symbol #0 to #13 in the slot,
the bit of which value is set to 1 indicates a start of a PDCCH monitoring occasion,
the bitmap information is set such that two adjacent PDCCH monitoring occasions in the slot do not overlap with each other, and the two adjacent PDCCH monitoring occasions in the slot are based on a single CORESET duration parameter and a single resource block frequency-domain parameter.

2. A base station comprising:
a higher layer processor configured to send a first radio resource control (RRC) configuration including first information for indicating a control resource set (CORESET) duration, and to send a second RRC configuration including second information for indicating physical downlink control channel (PDCCH) monitoring symbols, to send third information for indicating PDCCH monitoring periodicity k, and to send fourth information for indicating PDCCH monitoring offset o; and
transmitting circuitry configured to transmit a PDCCH, based on the first information, the second information, the third information, and the fourth information;
wherein 0≤o<k, the CORESET duration is set to a value larger than 1,
the second information expresses a PDCCH monitoring pattern within a slot and is bitmap information that includes 14 bits,
each bit of the bitmap information corresponds to a respective OFDM symbol #0 to #13 in the slot,
the bit of which value is set to 1 indicates a start of a PDCCH monitoring occasion,
the bitmap information is set such that two adjacent PDCCH monitoring occasions in the slot do not overlap with each other, and
the two adjacent PDCCH monitoring occasions in the slot are based on a single CORESET duration parameter and a single resource block frequency-domain parameter.

3. A method for a user equipment (UE), the method comprising:
acquiring a first radio resource control (RRC) configuration including first information for indicating a control resource set (CORESET) duration;
acquiring a second RRC configuration including second information for indicating physical downlink control channel (PDCCH) monitoring symbols;
acquiring third information for indicating PDCCH monitoring periodicity k;
acquiring fourth information for indicating PDCCH monitoring offset o; and
monitoring a PDCCH, based on the first information, the second information, the third information, and the fourth information;
wherein 0≤o<k, the CORESET duration is set to a value larger than 1,
the second information expresses a PDCCH monitoring pattern within a slot and is bitmap information that includes 14 bits,
each bit of the bitmap information corresponds to a respective OFDM symbol #0 to #13 in the slot,
the bit of which value is set to 1 indicates a start of a PDCCH monitoring occasion,
the bitmap information is set such that two adjacent PDCCH monitoring occasions in the slot do not overlap with each other, and
the two adjacent PDCCH monitoring occasions in the slot are based on a single CORESET duration parameter and a single resource block frequency-domain parameter.

4. A method for a base station, the method comprising:
sending a first radio resource control (RRC) configuration including first information for indicating a control resource set (CORESET) duration;
sending a second RRC configuration including second information for indicating physical downlink control channel (PDCCH) monitoring symbols;
sending third information for indicating PDCCH monitoring periodicity k;
sending fourth information for indicating PDCCH monitoring offset o; and
transmitting a PDCCH, based on the first information, the second information, the third information, and the fourth information;
wherein 0≤o<k, the CORESET duration is set to a value larger than 1,
the second information expresses a PDCCH monitoring pattern within a slot and is bitmap information that includes 14 bits,
each bit of the bitmap information corresponds to a respective OFDM symbol #0 to #13 in the slot,
the bit of which value is set to 1 indicates a start of a PDCCH monitoring occasion,
the bitmap information is set such that two adjacent PDCCH monitoring occasions in the slot do not overlap with each other, and
the two adjacent PDCCH monitoring occasions in the slot are based on a single CORESET duration parameter and a single resource block frequency-domain parameter.

* * * * *